US012789490B2

United States Patent
(12) United States Patent
Prunchak et al.

(10) Patent No.: US 12,789,490 B2
(45) Date of Patent: Nov. 10, 2026

(54) MOLDED ARTICLE EXTRACTOR AND METHOD

(71) Applicant: BRIDGESTONE BANDAG, LLC, Nashville, TN (US)

(72) Inventors: Steven W. Prunchak, Muscatine, IA (US); John R. White, Muscatine, IA (US); Keith R. Gerhart, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 142 days.

(21) Appl. No.: 18/652,630

(22) Filed: May 1, 2024

(65) Prior Publication Data

US 2024/0278517 A1 Aug. 22, 2024

Related U.S. Application Data

(62) Division of application No. 17/538,192, filed on Nov. 30, 2021, now Pat. No. 12,083,758.

(Continued)

(51) Int. Cl.

*B29D 30/00* (2006.01)
*B25J 15/00* (2006.01)

(Continued)

(52) U.S. Cl.

CPC ...... *B29D 30/0061* (2013.01); *B25J 15/0014* (2013.01); *B25J 15/0028* (2013.01);

(Continued)

(58) Field of Classification Search

CPC ........ B29C 37/0007; B29C 2043/5069; B29D 30/0603; B29D 2030/0038; B29D 30/0061; B29D 30/0681; B29L 2030/002

See application file for complete search history.

(56) References Cited

U.S. PATENT DOCUMENTS 4,571,320 A 2/1986 Walker
5,295,802 A 3/1994 Hersbt (Continued)

FOREIGN PATENT DOCUMENTS

CN 1093973 10/1994
EP 0 583 600 A1 2/1994

(Continued)

OTHER PUBLICATIONS

Translation of JP-H0832418-B2 (Year: 1996).*

(Continued)

*Primary Examiner* — John J DeRusso

(74) *Attorney, Agent, or Firm* — Matthew Jupina; Kiri Sharon

(57) ABSTRACT

A system including a rail assembly and a tread extraction assembly coupled to the rail assembly is provided. The tread extraction assembly includes a base frame and a first clamping assembly. The first clamping assembly has a first clamp movable relative to the base frame. The first clamp is configured to clamp a portion of a tire tread in a tread mold. Further, a system for removing a tire tread from a tread mold is provided. The system includes a tread extraction assembly coupled to a rail assembly. The rail assembly is configured to translate along a rail positioned adjacent the tread mold. The rail assembly is pivotably coupled to the base frame by a first linkage arm and a second linkage arm and configured to pivot the tread extractor assembly from a position adjacent the tread mold to a position over the tread mold.

15 Claims, 13 Drawing Sheets

Related U.S. Application Data

(60) Provisional application No. 63/119,945, filed on Dec. 1, 2020.

(51) Int. Cl.
*B29C 37/00* (2006.01)
*B29C 43/50* (2006.01)
*B29D 30/06* (2006.01)
*B29L 30/00* (2006.01)

(52) U.S. Cl.
CPC ....... *B25J 15/0052* (2013.01); *B29C 37/0007* (2013.01); *B29D 30/0603* (2013.01); *B29D 30/0681* (2013.01); *B29C 2043/5069* (2013.01); *B29D 2030/0038* (2013.01); *B29L 2030/002* (2013.01)

(56) References Cited

U.S. PATENT DOCUMENTS

| | | | | |
|---|---|---|---|---|
| 5,629,031 | A | 5/1997 | Ishikawa et al. | |
| 6,685,867 | B2 | 2/2004 | Wellman et al. | |
| 8,807,984 | B2 | 8/2014 | Gridley et al. | |
| 2006/0034967 | A1 | 2/2006 | Habisreitinger et al. | |
| 2010/0052221 | A1 | 3/2010 | Goossens et al. | |
| 2011/0101568 | A1 | 5/2011 | Gallego et al. | |
| 2013/0069283 | A1 | 3/2013 | Gallego et al. | |
| 2015/0367539 | A1 | 12/2015 | Pan et al. | |
| 2016/0136848 | A1 | 5/2016 | Gallego et al. | |
| 2018/0009182 | A1* | 1/2018 | Pan | B29D 30/0606 |
| 2020/0316787 | A1 | 10/2020 | Fujihara et al. | |
| 2022/0088800 | A1* | 3/2022 | Patil | B25J 15/0014 |

FOREIGN PATENT DOCUMENTS

| | | | | |
|---|---|---|---|---|
| EP | 3 041 650 | A1 | 7/2016 | |
| JP | S5619715 | | 2/1981 | |
| JP | H0832418 | B2 * | 3/1996 | B29C 37/0007 |
| KR | 20110129599 | A | 12/2011 | |
| WO | WO-2008/057077 | A1 | 5/2008 | |
| WO | WO-2013/062699 | A1 | 5/2013 | |
| WO | WO-2014/120213 | A1 | 8/2014 | |

OTHER PUBLICATIONS

European Search Report for EP Application No. 21211509, dated Mar. 22, 2023.
https://www.youtube.com/watch?v=IYw1X8wpidU, Plastic Mold Extraction & Assembly—Kawasaki Robotics, Mar. 6, 2014.
https://www.youtube.com/watchZv=aA-O43IYXnc, Injection molding machine part removal, Oct. 26, 2012.
US Office Action on U.S. Appl. No. 17/538,192, dated Sep. 21, 2023.

* cited by examiner

MOLDED ARTICLE EXTRACTOR AND METHOD

CROSS-REFERENCE TO RELATED APPLICATIONS

The present application is a divisional of U.S. patent application Ser. No. 17/538,192, filed Nov. 30, 2021, which claims priority to U.S. Provisional Patent Application No. 63/119,945 filed Dec. 1, 2020, both of which are incorporated herein by reference in their entireties.

FIELD OF USE

This disclosure relates to a device and method for removing molded articles from their molds and, more particularly, to the removal of a vulcanized rubber molded article such as a tire tread from a mold of a curing press.

BACKGROUND

Molded articles may be formed when a preform of an article is placed in a mold for shaping. Removal of the article from the mold after a forming operation is complete without causing damage to the molded article is often carried out as a separate operation during the manufacturing process. Depending on the shape, placement and orientation of various physical features of the molded article, the removal of the article from the mold may require special care to avoid tearing, breakage, or other damage.

In the field of tire manufacturing, a common molding operation includes vulcanizing a rubber composite material in a curing press. Curing presses include molds that enclose a rubber composite preform to provide pressure and heat cures the preform into a useable article, for example, a strip or belt of tire tread. Such tire treads are typically used in tire retreading and other applications.

A typical curing press mold includes a mold plate that forms a cavity. One side of the cavity forms various depressions and ridges that correspond to the desired tread pattern of the tire tread that will emerge therefrom. A plate or platen is placed over the mold cavity after a tread preform has been loaded into the cavity. Pressure and heat are provided by the press to force the preform to assume the shape of the mold cavity and to cure the preform into vulcanized rubber.

SUMMARY

In certain tread patterns, such as those used for trucks or off-road applications, the tread lugs may have a substantial height relative to the overall thickness of the tread, the tread sipes may be closely spaced, the lugs may have negative draft angles, and other features that can create challenges when prying the finished tread from the mold. Given that rubber is an inherently elastic material, simply pulling one end of the finished tire tread to remove the tread from the mold may present various challenges, including stretching of the tread, tearing or cracking of the tread, and other effects.

At least one embodiment relates to a tread extraction assembly. The tread extraction assembly includes a base frame, a first clamping assembly, and a second clamping assembly. The base frame defines a leading edge. The first clamping assembly includes a first clamp movable relative to the base frame. The second clamping assembly is coupled to the base frame and includes a second clamp positioned proximate to the leading edge. The tread extraction assembly also includes a linear rail and a linear bearing. The first clamping assembly is coupled to the linear bearing and movable along the linear rail by a linear actuator.

Another embodiment relates to a method of extracting a tire tread from a tread mold. The method includes positioning a tread extractor assembly over a tread mold, extending a first clamping assembly of the tread extractor assembly from a first position to a second position, and clamping a portion of a tire tread with the first clamping assembly. After the portion of the tire tread is clamped by the first clamping assembly, the first clamping assembly is retracted from the second position to the first position while the portion of the tire tread is clamped by the first clamping assembly. Lastly, the method includes translating the tread extractor assembly along a length of the tread mold while the portion of the tire tread is clamped by the first clamping assembly.

Another embodiment relates to a system. The system includes a rail assembly and a tread extraction assembly. The tread extraction assembly is coupled to the rail assembly and includes a base frame and a first clamping assembly. The first clamping assembly includes a first clamp movable relative to the base frame, where the first clamp is configured to clamp a portion of a tire tread lying in a tread mold.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a tread extractor assembly is provided. The tread extractor assembly is configured to selectively grip a tire tread that lies within a mold and pull the tire tread out of the mold. In some embodiments, the tread extractor assembly is coupled to a rail assembly that translates the tread extractor assembly back and forth in a linear direction along the mold. The tire tread may be clamped in the tread extractor assembly and then the rail assembly may translate the tread extractor assembly in a direction such that the tire tread is removed from the mold. In some embodiments, the tire tread is positioned within the mold such that the pattern side is face-down (e.g., facing away from the tread extractor assembly). Thus, when the tread extractor assembly grips the tire tread and the rail assembly translates the tread extractor assembly in a direction, the tire tread is flipped such that the tread side is pattern side up (e.g., facing toward the tread extractor assembly).

Figure 1:
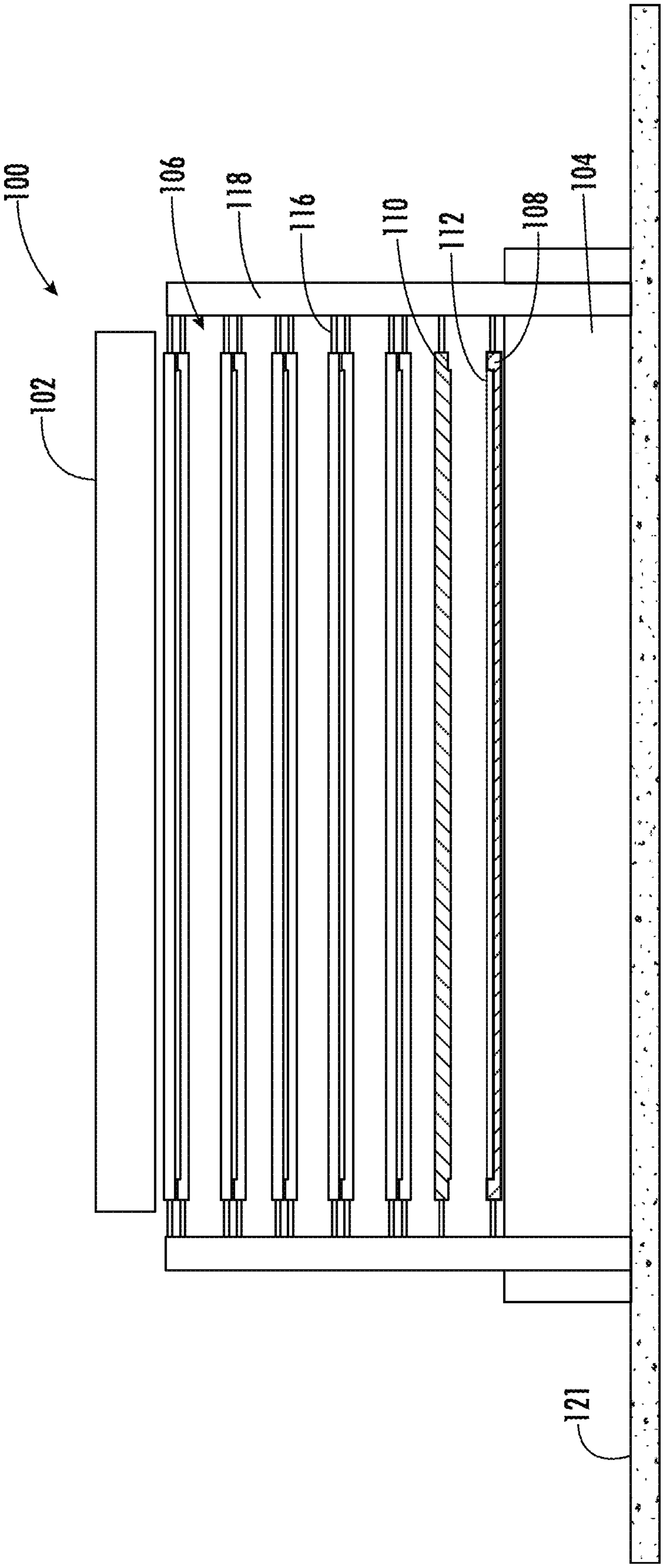
FIG. 1 is a side view of a curing press, according to an example embodiment.

A curing press 100 from a side perspective is partially shown in FIG. 1. The curing press 100 may be part of a larger tread forming operation that includes, for example, a composite preform building apparatus, a forming press, and other structures (not pictured). The curing press 100 includes top and bottom press blocks 102 and 104. Between the press blocks 102 and 104 are a plurality of mold assemblies 106, each including two parts that come together to define an internal molding cavity. In the illustration of FIG. 1, a mold 108 and a platen 110 make up the mold assembly, but other configurations may be used. For example, what is referred to relative to FIG. 1 as a mold 108 may be positioned in an inverted orientation in the curing press 100 such that a mold cavity 112 is facing down. In such an embodiment, the platen 110 is positioned below the mold 108 such that it fits over the mold cavity. In the description that follows, a particular orientation having the mold 108 located beneath the platen 110 is discussed for illustration, but it should be appreciated that the relative orientation of these two elements may be in other orientations. Moreover, although six mold assemblies 106 are shown, a single assembly or a different number of mold assemblies may be used. Each mold 108 forms a mold cavity 112 into which a preform is packed or loaded. Following the application of pressure and heat to the closed mold assembly 106, a vulcanized tread 114 (e.g., tread, tire tread, etc.) can emerge. In other alternatives, the press 100 may be configured to provide continuous manufacture of the molded article or a tread in belt or other form.

The curing press 100 further includes linkages 116 that connect the parts of each mold assembly 106 to frame members or posts 118, which include mechanisms (not shown) that can selectively move the various parts of each mold assembly 106 vertically to enable the loading of preforms and the unloading of finished treads from each mold assembly 106.

Moreover, a tread extractor assembly may be connected to a horizontally extending rail 121 by a rail assembly. The rail assembly, and thus the tread extractor assembly, is configured to traverse the curing press 100 at least along the rail 121, the rail 121 extending along the length of the curing press 100. In some embodiments, a tread extractor assembly is associated with each of the mold assemblies 106. For example, if the curing press 100 includes six mold assemblies, then six tread extractor assemblies may facilitate removal of the tread from each of the mold assemblies and each of the six tread extractor assemblies may traverse the curing press 100 along the rail 121.

In a forming process for a tread 114, a tread preform, which may be built by successively stacking layers of rubber with other materials such as thread, fabric, steel belts, wire mesh and the like, is loaded into a mold 108. Each mold 108 has ridges and depressions formed therein that will shape and mold the lugs and sipes of a desired pattern in the emerging tread 114. The platen 110 is placed in opposed relationship to the mold cavity 112 and a curing process ensues that vulcanizes the preform into the tread 114. The tread is thereafter detached and removed from the mold 108.

Figure 2:
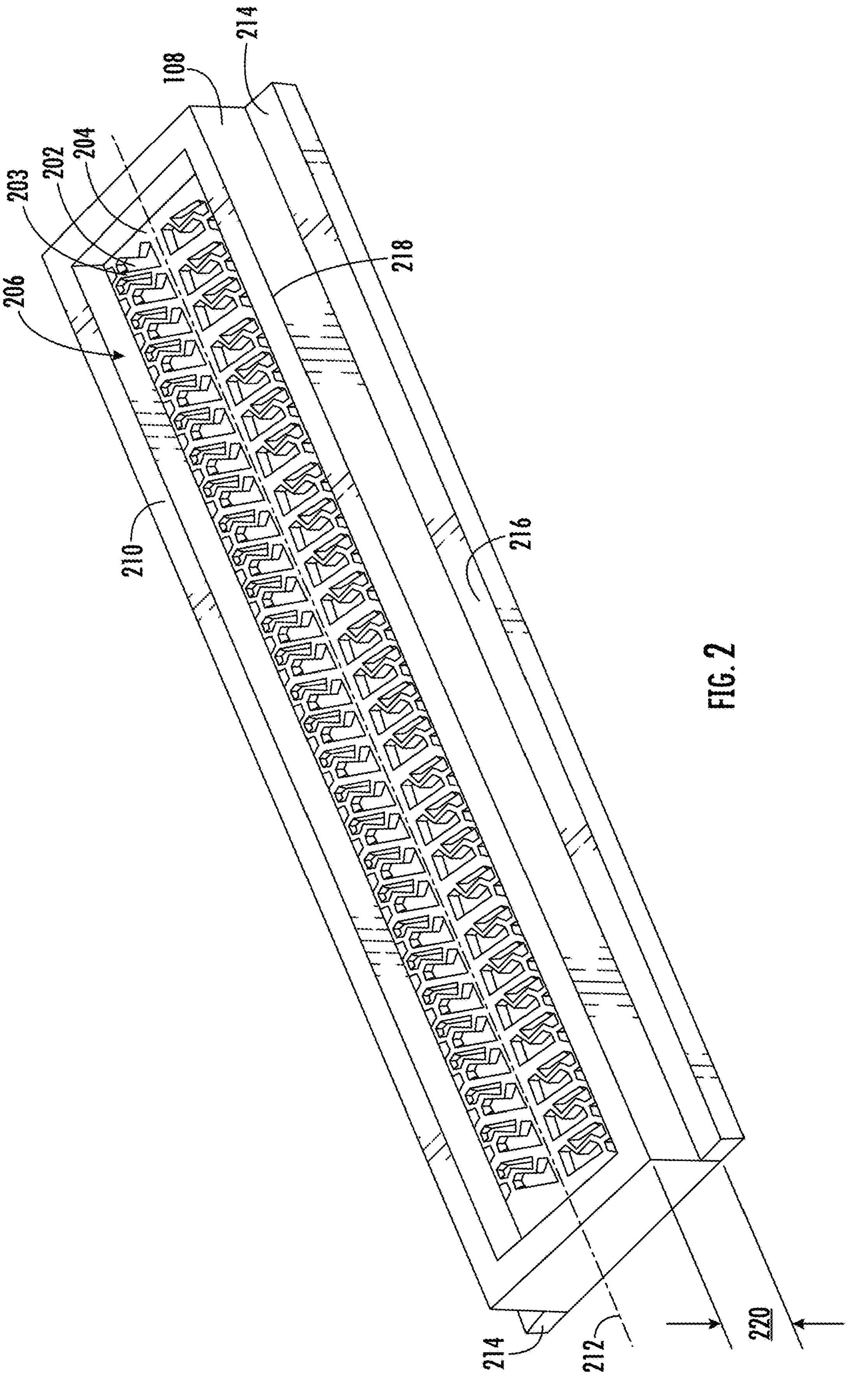
FIG. 2 is a perspective view of a mold of the curing press of FIG. 1.

When forming the tread 114, the mold 108 imprints onto the preform a predetermined pattern of lugs and/or ribs. In reference to FIG. 2, these lugs are formed as depressions 202 in a bottom surface 204 of the mold 108, which are separated by sipe blades or ridges 203. The mold 108 forms an internal cavity 206 that is open from the top and surrounded by the bottom surface 204 and walls 210 that extend around the perimeter of the cavity 206. Although a mold configured to form a single tread strip is shown, the mold 108 may include two or more additional cavities extending parallel to one another and configured to form two or more tread strips from a single preform. In the illustrated embodiment, the single-cavity mold 108 has a generally elongate rectangular shape that extends along an axis 212.

Figure 3:
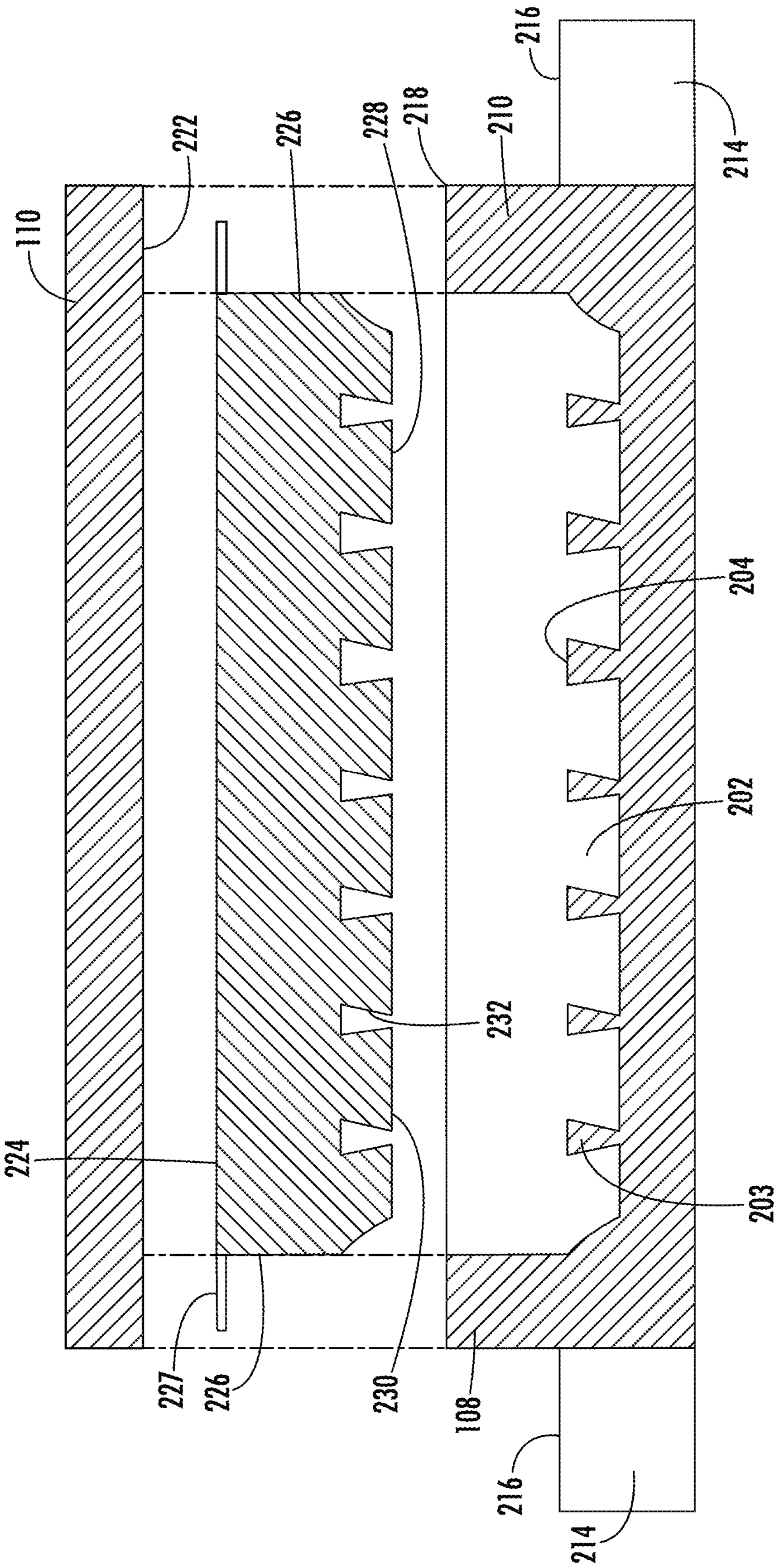
FIG. 3 is a front, cross-sectional view of the mold of FIG. 2.

A cross section of the mold assembly 106 during a molding operation phase is shown in FIG. 3. In this illustration, the mold assembly 106 is shown opened following a molding and curing operation for the tread 114. The top mold or platen 110 includes a bottom surface 222 that forms the mounting surface (e.g., top surface, inner surface) 224 of the tread 114. The lateral surfaces 226 and the outer or tread surface 228 of the tread 114 are formed, respectively, by the side walls 210 and bottom surface 204 of the mold 108. Flash 227 may remain on the tread 114 along the interface between the platen 110 and the mold 108. A plurality of lugs 230 arranged along the tread surface 228 are formed by the corresponding lug depressions 202.

As may be seen in the cross section of FIG. 3, certain tread patterns may include small or even negative draft angles formed in the surfaces around the sides of the lugs 230. Draft angle denotes the resulting angle formed by mold surfaces relative to the direction of removal of the molded article from the mold. Accordingly, positive draft angles are disposed such that the removal of the molded article is facilitated, whereas negative draft angles are disposed such that at least some deformation of the molded article is required to remove it from the mold. In the cross section of FIG. 3, the lugs 230 have negative draft angles on their side surfaces 232, which have been exaggerated for the sake of illustration. As can be appreciated, certain portions of the lugs would have to elastically deform when removing the tread 114 from the mold 108. Depending on the amount of material subject to such deformation during removal of the tread from the mold 108, the force required to remove the tread 114 from the mold may increase, as will the potential for damage to the tread 114 due to cracking or tearing as previously described. The mold 108 further includes two tracks or ledges 214 extending along its sides, generally parallel to the axis 212. Each ledge 214 is disposed on one side of the mold 108 and includes a track 216 that extends generally parallel to a top edge 218 of the side portion of the wall 210 at an offset vertical distance 220 therefrom. Although the ledges 214 are shown to have a length that is about equal to the overall length of the mold 108 in FIG. 2, the ledges 214 can extend past the ends of the mold 108.

Figure 4:
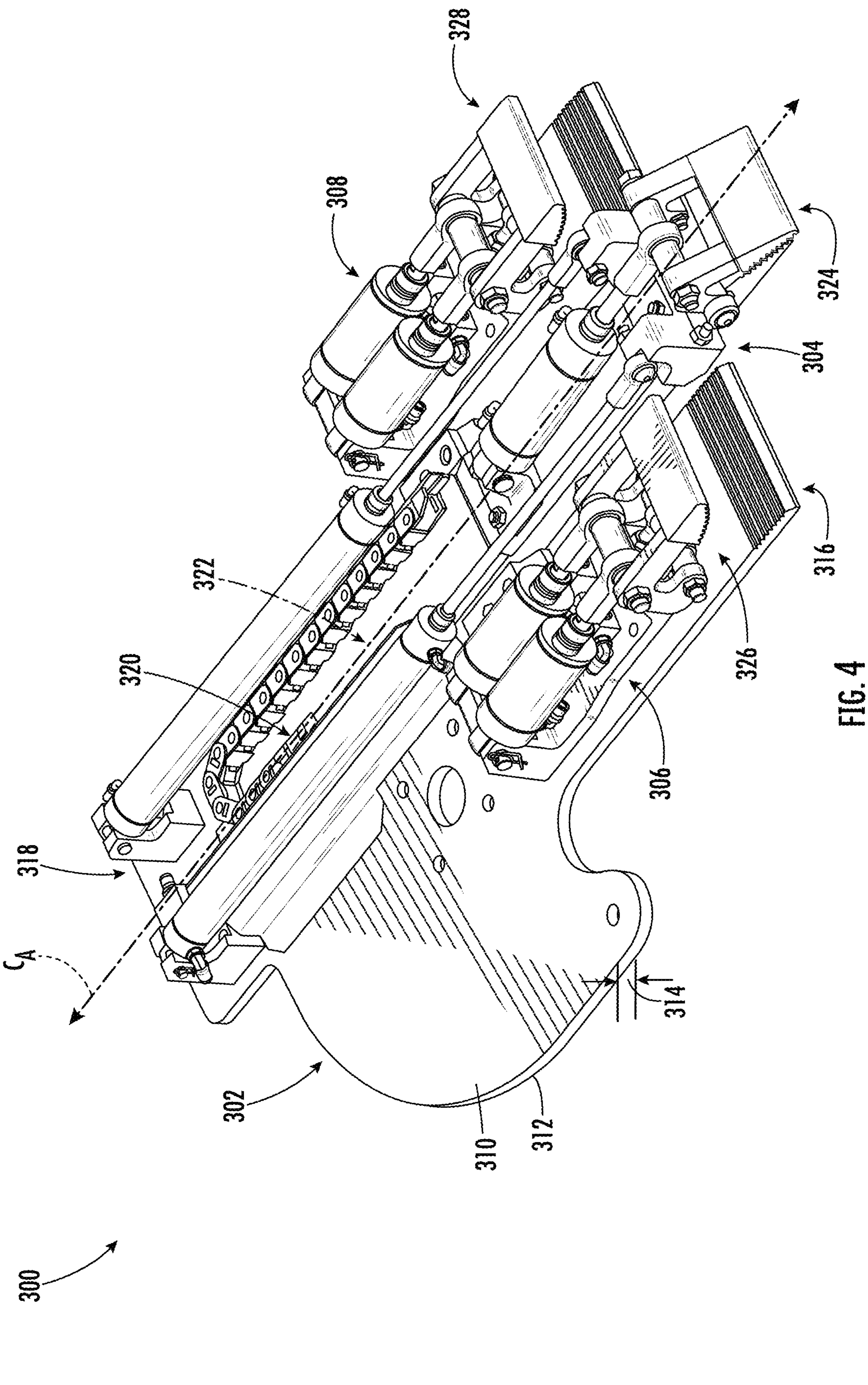
FIG. 4 is perspective view of a tread extractor assembly, according to an example embodiment.
Figure 10:
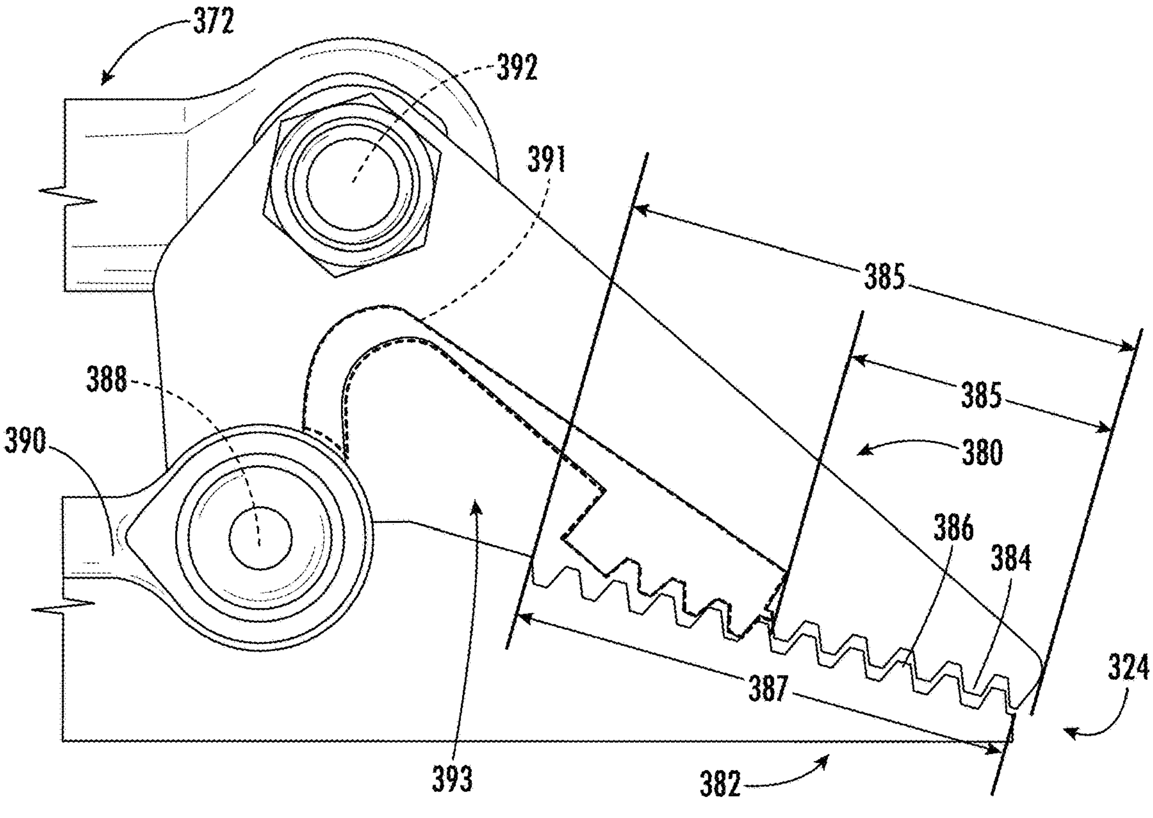
FIG. 10 is a side view of the first clamp of the first clamping assembly of FIG. 7 in an engaged position, according to an example embodiment.

Referring now to FIG. 4, a perspective view of a tread extractor assembly 300 is provided. The tread extractor assembly 300 includes a base frame 302, a first clamping assembly 304, a second clamping assembly 306, and a third clamping assembly 308. The base frame 302 is formed of a substantially planar material having a first frame surface (e.g., top face) 310 and a second frame surface 312 substantially parallel to one another. The base frame 302 further includes a frame thickness 314 separating the first frame surface 310 from the second frame surface (e.g., bottom face) 312. In some embodiments, the base frame 302 is formed of a substantially rigid material, such as metal, wood, plastic, or a similar material. The base frame 302 is coupled to the rail assembly (e.g., the rail assembly 500, shown in FIG. 10) such that the base frame 302 may traverse along the curing press 100 during a tread extraction process.

The base frame 302 further includes a first end (e.g., leading end, leading edge, etc.) 316 and a second end (e.g., trailing end, trailing edge, etc.) 318 opposite to the first end 316. In some embodiments, the base frame 302 defines a flat edge proximate to one of or both of the first end 316 and the second end 318. During a tread extraction process, the tire tread is clamped to the tread extractor assembly 300 proximate to the first end 316, and the base frame 302 translates in a direction toward the second end 318 such that the second end 318 leads the first end 316 as the rail assembly traverses the curing press 100.

Coupled to the base frame 302 are the first clamping assembly 304, the second clamping assembly 306, and the third clamping assembly 308. The first clamping assembly 304 is positioned in between (e.g., interposed between) the second clamping assembly 306 and the third clamping assembly 308. The first clamping assembly 304 is movable relative to all of base frame 302, the second clamping assembly 306, and the third clamping assembly 308. In some embodiments, the first clamping assembly 304 is coupled to a linear guide that facilitates movement of the first clamping assembly 304 along the central axis $C_A$. In some embodiments, the linear guide is a linear bearing assembly having a linear rail 320 coupled to the base frame 302 and a linear bearing 322 coupled to the first clamping assembly 304 and slidably coupled to the linear rail 320 such that the linear bearing 322 and the first clamping assembly 304 may traverse the length of the linear rail 320. The first clamping assembly 304 includes a first clamp 324 that is movable relative to the base frame 302. In other words, during a tread extraction process, the first clamping assembly 304 translates along the linear rail 320 such that the first clamp 324 of the first clamping assembly 304 extends beyond the first end 316 of the base frame 302 and grips (e.g., clamps to, selectively couples to, etc.) a portion of the tread 114 positioned within the mold 108. After the first clamp 324 has a secure grip on the portion of the tire tread, the first clamping assembly 304 translates along the linear rail 320 in a direction toward the second end 318 of the base frame 302. The first clamping assembly 304 is operable between a first position and a second position. In the first position, the first clamping assembly 304 is positioned such that the first clamp 324 is positioned between the first end 316 and the second end 318 of the base frame 302. In the second position, the first clamping assembly 304 is positioned such that the first clamp 324 is positioned beyond the first end 316 (e.g., away from the base frame 302). In other words, the first clamping assembly 304 is operable to position the first clamp 324 beyond the first end 316 (e.g., in the second position) and in between the first end 316 and the second end 318 (e.g., the first position). In some embodiments, the linear rail 320 and the linear bearing 322 cooperate to prevent lateral movement of the first clamp 324 away from the central axis $C_A$ except for the lateral movement allowed by the manufacturing tolerances of the linear rail 320 and the linear bearing 322.

The second clamping assembly 306 and the third clamping assembly 308 are operable to selectively grip the tire tread 114 after the first clamp 324 has gripped the portion of the tire tread and the first clamp 324 is positioned between the first end 316 and the second end 318. The second clamping assembly 306 includes a second clamp 326 positioned proximate to the first end 316 of the base frame 302. The second clamp 326 is similar to the first clamp 324. A difference between the first clamp 324 and the second clamp 326 is that the second clamp 326 includes a portion of the base frame 302. In some embodiments, the second clamping assembly 306 is configured to secure the tire tread 114 between the second clamping assembly 306 and the base frame 302. Specifically, the second clamp 326 includes a portion of the base frame 302 proximate to the first end 316. The third clamping assembly 308 includes a third clamp 328 positioned proximate to the first end 316 of the base frame 302. The third clamp 328 is similar to the second clamp 326. In some embodiments, the third clamping assembly 308 is configured to secure the tire tread 114 between the third clamp 328 and the base frame 302. Specifically, the third clamp 328 includes a portion of the base frame 302 proximate to the first end 316.

After the first clamp 324 is in the retracted position and is gripping the portion of the tire tread, the second clamp 326 and the third clamp 328 grip the tire tread. After all three of the first clamp 324, the second clamp 326, and the third clamp 328 are secured to the tire tread, the rail assembly translates in a direction such that the first end 316 trails the second end 318. As the tread extractor assembly 300 is translated along the rail 121, the tire tread 114 is pulled out of the mold 108 and the pattern side faces upward.

In some embodiments, the tread extractor assembly 300 does not include both the second clamping assembly 306 and the third clamping assembly 308. For example, the tread extractor assembly 300 may include only the third clamping assembly 308 since the cooperative clamping force from both the first clamp 324 and the third clamp 328 is enough to complete a tire extraction process.

Figure 5:
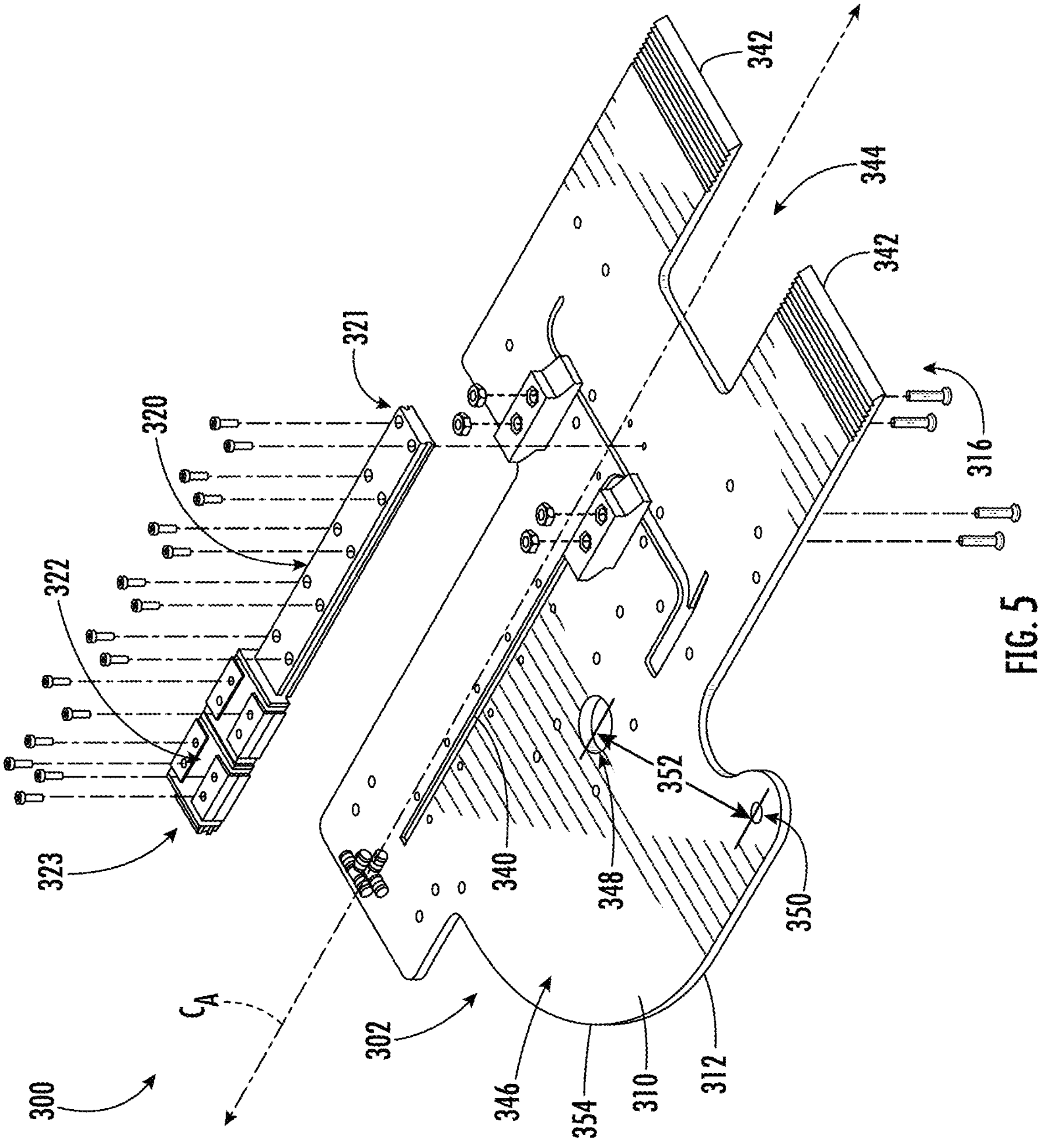
FIG. 5 is an exploded view of a portion of the tread extractor assembly of FIG. 4.

Referring now to FIG. 5, a partially exploded view of the tread extractor assembly 300 is shown. The base frame 302 includes a plurality of thru-holes configured to receive fasteners for coupling the various components of the tread extractor assembly 300. Extending along (e.g., parallel to) the central axis $C_A$ is the linear rail 320. The linear rail 320 defines a first rail end 321 and a second rail end 323 opposite to the first rail end 321. The first rail end 321 is positioned nearer to the first end 316 than the second rail end 323.

Positioned between the base frame 302 and the linear rail 320 is a channel 340 extending partially into the base frame 302 such that the channel 340 interrupts the first frame surface 310 but not the second frame surface 312. A portion of the channel 340 extends substantially parallel to the central axis $C_A$ underneath the linear rail 320. Proximate to an end of the linear rail 320 closest to the first end 316, the channel 340 may branch apart into two portions, each of the two portions extending proximate to where the second clamping assembly 306 and the third clamping assembly 308 are positioned. The channel 340 may receive various conduits, such as wires, air conduits, hydraulic conduits, and like such that the various conduits do not interfere with the motion of the first clamping assembly 304.

A first edge 342 is defined at the first end 316. In some embodiments, the first edge 342 is perpendicular to the central axis $C_A$. Interrupting the first edge 342 and extending into the base frame 302 is a base cut-out 344 configured to receive the first clamp 324. The base cut-out 344 provides clearance for the first clamp 324 when the first clamping assembly 304 is in a retracted position and the first clamp 324 is positioned between the first end 316 and the second end 318.

The base frame 302 includes an ambidextrous wing 346 that extends laterally away from the base frame 302 relative to the central axis $C_A$. In some embodiments, the wing 346 is integrally formed with the base frame 302 such that the wing 346 and the base frame 302 are formed of a single piece, such as being milled or stamped from block aluminum or steel. As utilized herein, two or more elements are said to be integrally formed with each when the two or more elements are formed and joined together as part of a single manufacturing process to create a single-piece or unitary construction that cannot be disassembled without an at least partial destruction of the overall component. In some embodiments, the wing 346 is manufactured separately from the base frame 302 and later coupled to the base frame 302. In some embodiments, the wing 346 is removably coupled to the base frame 302 such that the wing 346 may be removed and coupled to the alternate side of the base frame 302. The ambidextrous wing 346 includes a first pivot aperture 348 and a second pivot aperture 350 separated from one another by a pivot distance 352. The first pivot aperture 348 and the second pivot aperture 350 are configured for coupling with the rail assembly. When the rail assembly is in a rest position, the tread extractor assembly 300 may be pivoted away from the mold 108 such that the tread extractor assembly 300 does not interfere with the vertical conveyor movement of the mold 108 and platen 110. When it comes time to extract the tire tread 114 from the mold 108, the tread extractor assembly 300 may be pivoted into the mold assembly 106 and above the mold 108 (e.g., in between two molds). The first pivot aperture 348 and the second pivot aperture 350 receive pivoting components that allow the tread extractor assembly 300 to pivot into and out of a working position above the mold 108.

In some embodiments, because the ambidextrous wing 346 is removably coupled with the base frame 302, the wing 346 may be removed from one side and coupled to the other such that the tread extractor assembly 300 can pivot into the curing press 100 in either a clockwise or counterclockwise motion.

The wing 346 further includes a radius 354 having a center at the first pivot aperture 348. In some embodiments, the radius 354 interfaces with a portion of the rail assembly to guide rotational movement of the tread extractor assembly 300 as the tread extractor assembly 300 pivots into and out of the curing press 100. In some embodiments, the radius 354 approximates a quarter circle having a center at the first pivot aperture 348.

Figure 6:
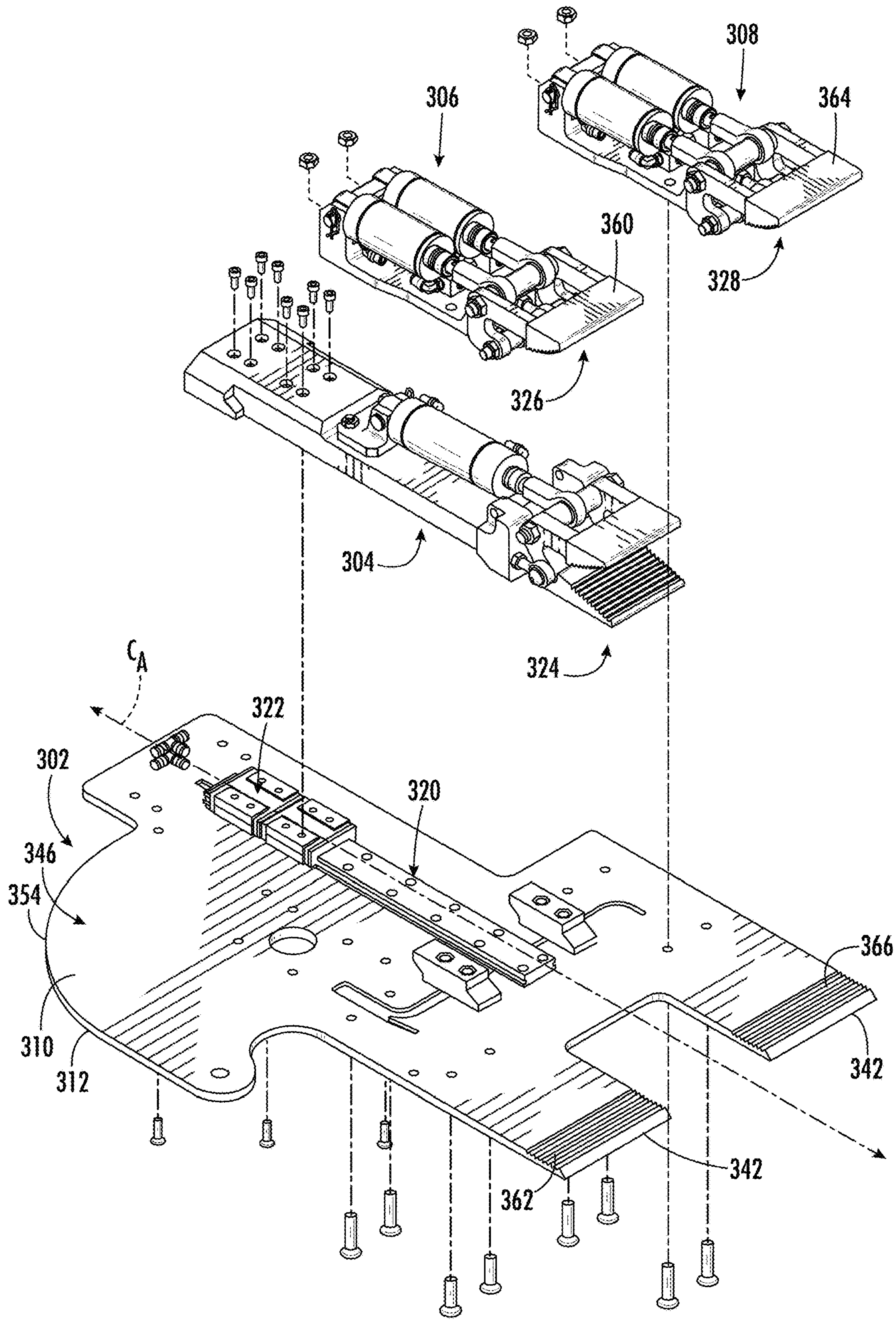
FIG. 6 is another exploded view of a portion of the tread extractor assembly of FIG. 4.

Referring now to FIG. 6, a partially exploded view of the tread extractor assembly 300 is shown partially assembled. Through holes proximate to the end of the first clamping assembly 304 closest to the second end 318 are configured to receive fasteners for coupling the first clamping assembly 304 to the linear bearing 322. The first clamping assembly 304 extends away from the linear bearing 322 and is cantilevered toward the first end 316 such that when the linear bearing 322 is positioned at the second rail end 323, the first clamp 324 may be positioned above the first rail end 321. When the linear bearing 322 is positioned at the first rail end 321, the first clamp 324 is positioned beyond the first end 316. In some embodiments, stops are positioned at both the first rail end 321 and the second rail end 323 to prevent the linear bearing 322 from sliding off of the linear rail 320.

The second clamping assembly 306 includes through holes corresponding to through holes extending through the base frame 302 such that fasteners may be used to couple the second clamping assembly 306 to the base frame 302. In some embodiments, the second clamping assembly 306 is permanently coupled to the base frame 302, such as by welding, epoxy, adhesives, and the like. In some embodiments, the second clamping assembly 306 is removably coupled to the base frame 302 such that the second clamping assembly 306 may be removed from the tread extractor assembly 300 for servicing or replacement. The second clamp 326 includes a movable portion (e.g., upper jaw) 360 and a fixed portion (e.g., engagement surface) 362. In some embodiments, the fixed portion 362 is integrally formed with the base frame 302 such that the fixed portion 362 is configured to cooperate with the second clamp 326, and more specifically the movable portion 360, to selectively clamp the tire tread 114 during a tread extraction process. The movable portion 360 is operatively coupled to the second clamping assembly 306 such that the movable portion 360 may operate between an open position and a closed position. In the closed position, the movable portion 360 is rotated into the fixed portion 362 such that a clamping force is realized between the movable portion 360 and the fixed portion 362. When transitioning from the closed position and toward the open position, the movable portion 360 is rotated upwards and away from the fixed portion 362. As shown in FIG. 6, the fixed portion 362 is integrated within the base frame 302, such as by machining, milling, forging, cutting, or a similar manufacturing process. Forming the fixed portion 362 with the base frame 302 may reduce the cost and complexity of the second clamping assembly 306. In some embodiments, the fixed portion 362 is removably coupled to the base frame 302 such that the fixed portion 362 may be replaced if the fixed portion 362 wears out or if a different tooth configuration is required or desired for a particular tread extraction process. For example, the base frame 302 may include a slot configured to receive the fixed portion 362 and the fixed portion 362 may be coupled with the slot using a set screw, latches, or the like. When the fixed portion 362 is to be replaced, the fixed portion 362 may be removed and a new fixed portion (e.g., engagement surface insert) may be coupled to the base frame 302.

The third clamping assembly 308 includes through holes corresponding to through holes extending through the base frame 302 such that fasteners may be used to couple the third clamping assembly 308 to the base frame 302. In some embodiments, the third clamping assembly 308 is permanently coupled to the base frame 302, such as by welding, epoxy, adhesives, and the like. In some embodiments, the third clamping assembly 308 is removably coupled to the base frame 302 such that the third clamping assembly 308 may be removed from the tread extractor assembly 300 for servicing or replacement. The third clamp 328 includes a movable portion 364 and a fixed portion 366. The movable portion 364 is operatively coupled to the third clamping assembly 308 such that the movable portion 364 may operate between an open position and a closed position. In the closed position, the movable portion 364 is rotated into the fixed portion 366 such that a clamping force is realized between the movable portion 364 and the fixed portion 366. When transitioning away from the closed position and toward the open position, the movable portion 364 is rotated upwards and away from the fixed portion 366. As shown in FIG. 6, the fixed portion 366 is integrated within the base frame 302, such as by machining, milling, forging, cutting, or a similar manufacturing process. Forming the fixed portion 366 with the base frame 302 may reduce the cost and complexity of the third clamping assembly 308. In some embodiments, the fixed portion 366 is removably coupled to the base frame 302 such that the fixed portion 366 may be replaced if the fixed portion 366 wears out or if a different tooth configuration is required or desired for a particular tread extraction process. For example, the base frame 302 may include a slot configured to receive the fixed portion 366 and the fixed portion 366 may be coupled with the slot using a set screw, latches, or the like. When the fixed portion 366 is to be replaced, the fixed portion 366 may be removed and a new fixed portion may be coupled to the base frame 302.

Figure 7:
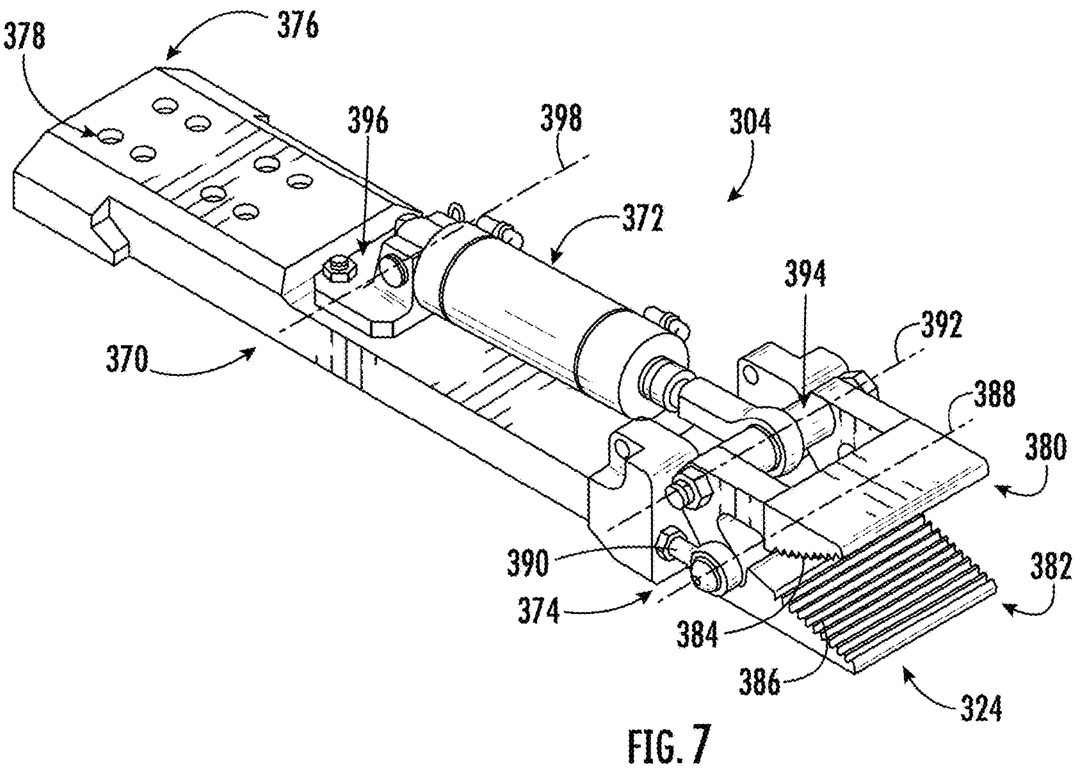
FIG. 7 is a perspective view of a first clamping assembly of the tread extractor assembly of FIG. 4.

Turning now to FIG. 7, a perspective view of the first clamping assembly 304 is shown. The first clamping assembly 304 includes the first clamp 324, a first platform 370, and a first actuator 372. The first platform 370 defines a first end 374 and a second end 376 opposite to the first end 374. When the first platform 370 is coupled to the linear bearing 322, the first end 374 is positioned nearer to the first end 316 than the second end 318. Extending through the first platform 370 proximate to the second end 376 is a plurality of through-holes 378 configured for receiving fasteners for coupling the first platform 370 to the linear bearing 322. Extending axially away from the first end 374 is the first clamp 324. The first clamp 324 includes an upper jaw 380 and a lower jaw 382. The upper jaw 380 and the lower jaw 382 are operable between an open position and a closed position. The upper jaw 380 is rotatably coupled to the first platform 370 and the lower jaw 382 is coupled to the first platform 370. The upper jaw 380 includes a first engagement surface 384 having ridges (e.g., teeth) that run substantially perpendicular to the central axis $C_A$ when the first clamping assembly 304 is coupled with the tread extractor assembly 300. Similarly, the lower jaw 382 includes a second engagement surface 386 configured to engage with the first engagement surface 384 when the first clamp 324 is in a closed position and nothing is interposed between the upper jaw 380 and the lower jaw 382. In some embodiments, the second engagement surface 386 includes knurling or ridges for better engagement with a material interposed between the upper jaw 380 and the lower jaw 382. In some embodiments, the first engagement surface 384 and the second engagement surface 386 are interchangeable and replaceable with engagement surface inserts having different knurling patterns and ridge patterns. For example, after many tire tread extraction processes, the ridges on the first engagement surface 384 and the second engagement surface 386 may wear down and start to release the tire tread too early during the tread extraction process. Thus, the first engagement surface 384 and the second engagement surface 386 may be replaced with new inserts having sharper and/or more pronounced knurling and/or teeth. In some embodiments, the upper jaw 380 and the lower jaw 382 are replaceable for similar reasons, such as damage and wear.

The lower jaw 382 is rigidly coupled to the first platform 370 such that only the upper jaw 380 is movable to operate the first clamp 324 between an open position and a closed position. In some embodiments, both the upper jaw 380 and the lower jaw 382 are movable such that the upper jaw 380 and the lower jaw 382 rotate toward one another to close. The upper jaw 380 rotates relative to the first platform 370 (and in some embodiments, the lower jaw 382) about a first jaw pivot 388 that extends through the upper jaw 380 and defines a rotational axis substantially perpendicular to the central axis $C_A$. The upper jaw 380 may be pivotally coupled to the first platform 370 at the first jaw pivot 388, such as with a fastener, pin, rivet, rod, bushing, and similar pivotable joints. In some embodiments, a pair of eyelets 390 extends away from the first end 374 of the first platform 370 and defines the first jaw pivot 388. In some embodiments, the first end 374 is extended and a hole is drilled through the first platform 370 along the first jaw pivot 388.

The upper jaw 380 further defines a second pivot axis 392 extending substantially parallel to the first jaw pivot 388. The first actuator 372 is pivotally coupled to the upper jaw 380 about the second pivot axis 392. In some embodiments, a rod 394, bolt, bushing, axel, or similar body extends along the second pivot axis 392 and is coupled both the upper jaw 380 and the first actuator 372. In some embodiments, the rod 394 is pivotally or rotatably coupled to at least one of or both of the upper jaw 380 and the first actuator 372. The first actuator 372 is pivotally coupled to both the upper jaw 380 and the first platform 370. In some embodiments, a fixture 396 is coupled to the first platform 370 to provide a third pivot axis 398 about which the first actuator 372 rotates relative to the first platform 370. The first actuator 372 may be pivotally coupled to the fixture 396 using a pin, bushing, or similar member configured to facilitate rotation.

The first actuator 372 provides a linear force between the fixture 396 and the upper jaw 380 that causes the first clamp 324 to rotate about the axis 392 and rotate toward the lower jaw 382 (e.g., open and close). The first actuator 372 is operable between an engaged position and a relaxed position. As shown in FIG. 7, the first actuator 372 is in a relaxed position. In the relaxed position, the first actuator 372 defines a minimum distance between the second pivot axis 392 and the third pivot axis 398. In the relaxed position, the first clamp 324 is in the open position. In the engaged position, the first actuator 372 applies a force between the second pivot axis 392 and the third pivot axis 398, increasing the distance between the third pivot axis 398 and the second pivot axis 392, and closing the first clamp 324.

In some embodiments, the first actuator 372 is a double-acting actuator. Specifically, instead of being operated between a relaxed position and an engaged position, the first actuator 372 is operable between a low-engagement setting and a high-engagement setting. In embodiments where the first actuator 372 is a double-acting actuator, the first actuator 372 may include a spring mechanism. In the low-engagement setting, the first actuator 372 may apply a force using the spring mechanism such that the first clamp 324 is in a closed position. However, the force may be light enough that an operator may open the first clamp 324 by hand. For example, the spring mechanism may close the first clamp 324 with a clamping force of between about 5 to about 15 psi (pound-force per square inch). When the first actuator 372 is in the high-engagement setting, the first actuator 372 uses a force mechanism different from the spring mechanism to apply a force greater than the force applied by the spring mechanism. For example, the first actuator 372 may close the first clamp 324 with a clamping force of between about 80 to about 120 psi. In some embodiments, the first actuator 372 may close the first clamp 324 with a clamping force of between about 90 to about 110 psi when the first actuator 372 is in the high-engagement setting.

The first actuator 372 is a linear actuator, configured to expand and contract (e.g., elongate and shorten) based on a signal received from a controller. For example, the first actuator 372 may be a fluid power actuator, such as a pneumatic cylinder or hydraulic cylinder. In some embodiments, the first actuator 372 is an electronic ball screw linear actuator.

Figure 8:
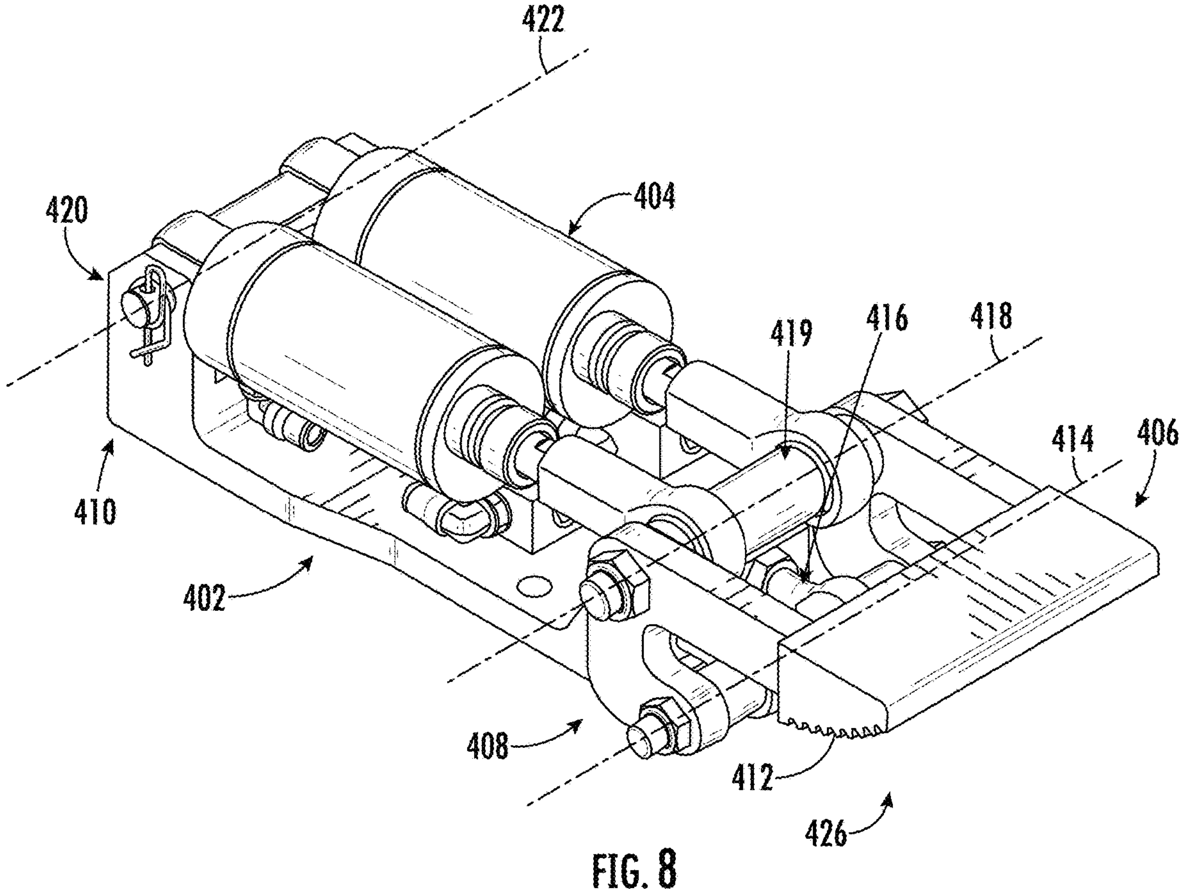
FIG. 8 is a perspective view of a second clamping assembly of the tread extractor assembly of FIG. 4.

Referring now to FIG. 8, a perspective view of the second clamping assembly 306 is shown. The third clamping assembly 308 is substantially similar to the second clamping assembly 306. The second clamping assembly 306 includes the second clamp 326 having an upper jaw 406, a second platform 402, and a second actuator 404. The second platform 402 defines a first end 408 and a second end 410 opposite to the first end 408. When the second platform 402 is coupled to the base frame 302, the first end 408 is positioned abutting the fixed portion 362 such that the upper jaw 406 is positioned above the fixed portion 362.

Extending axially away from the first end 408 is the upper jaw 406. When the second clamping assembly 306 is coupled to the base frame 302, the upper jaw 406 is operable between an open position and a closed position. The upper jaw 406 includes an engagement surface 412 having ridges that run substantially perpendicular to the central axis $C_A$ when the second clamping assembly 306 is coupled with the tread extractor assembly 300. The upper jaw 406 is configured to engage with the fixed portion 362 when the second clamp 326 is in a closed position and nothing is interposed between the upper jaw 406 and the fixed portion 362. In some embodiments, the engagement surface 412 includes knurling or ridges for better engagement with a material interposed between the upper jaw 406 and the fixed portion 362. In some embodiments, the engagement surface 412 is interchangeable and replaceable with engagement surface inserts having different knurling patterns and ridge patterns. For example, after many tire tread extracting processes, the ridges on the engagement surface 412 may wear down and start to release the tire tread too early during the tread extraction process. Thus, the engagement surface 412 may be replaced with new inserts having sharper and/or more pronounced knurling and/or teeth. In some embodiments, the upper jaw 406 is replaceable for similar reasons, such as damage and wear.

The upper jaw 406 rotates relative to the second platform 402 (and in some embodiments, the base frame 302) about a first pivot axis 414 that extends through the upper jaw 406 and defines a rotational axis substantially perpendicular to the central axis $C_A$. The upper jaw 406 may be pivotally coupled to the second platform 402 at the first pivot axis 414, such as with a fastener, pin, rivet, rod, bushing, and similar pivotable joint. In some embodiments, a pair of eyelets 416 extend away from the first end 408 of the second platform 402 and define the first pivot axis 414. In some embodiments, the first end 408 is extended and a hole is drilled through the second platform 402 along the first pivot axis 414.

The upper jaw 406 further defines a second pivot axis 418 extending substantially parallel to the first pivot axis 414. The second actuator 404 is pivotally coupled to the upper jaw 406 about the second pivot axis 418. In some embodiments, a rod 419, bolt, bushing, axel, or similar body extends along the second pivot axis 418 and is coupled both the upper jaw 406 and the second actuator 404. In some embodiments, the rod 419 is pivotally or rotatably coupled to at least one of or both of the upper jaw 406 and the second actuator 404. The second actuator 404 is pivotally coupled to both the upper jaw 406 and the second platform 402. In some embodiments, the second platform 402 includes a flange 420 that extends orthogonally away from the second platform 402 and provides a third pivot axis 422 about which the second actuator 404 rotates relative to the second platform 402. In other words, the second actuator 404 is pivotally coupled to the base frame 202 about the third pivot axis 422. The second actuator 404 may be pivotally coupled to the flange 420 by a pin, bushing, or similar member configured to facilitate rotation.

The second actuator 404 provides a linear force between the flange 420 and the upper jaw 406 that causes the upper jaw 406 to rotate toward the fixed portion 362 second clamp 326 to open and close when the second clamping assembly 306 is coupled to the base frame 302. The second actuator 404 is operable between an engaged (e.g., first) position and a relaxed (e.g., second) position. As shown in FIG. 8, the second actuator 404 is in a relaxed position. In the relaxed position, the second actuator 404 defines a minimum distance between the second pivot axis 418 and the third pivot axis 422. In the relaxed position, the second clamp 326 may be in the open position. In the engaged position, the second actuator 404 applies a force between the second pivot axis 418 and the third pivot axis 422, increasing the distance between the third pivot axis 422 and the second pivot axis 418, and closing the second clamp 326.

The second actuator 404 is a linear actuator, configured to expand and contract (e.g., elongate and shorten) based on a signal received from a controller. For example, the second actuator 404 may be a fluid power actuator, such as a pneumatic cylinder or hydraulic cylinder. In some embodiments, the second actuator 404 is an electronic ball screw linear actuator. In some embodiments, the second actuator 404 is a pair of actuators configured to provide a greater force when combined than the first actuator 372 can alone. When the second actuator 404 is engaged, the second actuator 404 closes the second clamp 326. In some embodiments, the second clamp 326 closes with a clamping force of between 150-200 psi. In some embodiments, the second actuator 404 may close the second clamp 326 with a clamping force of between 160-180 psi when the second clamping assembly 306 is coupled to the base frame 302.

Figure 9:
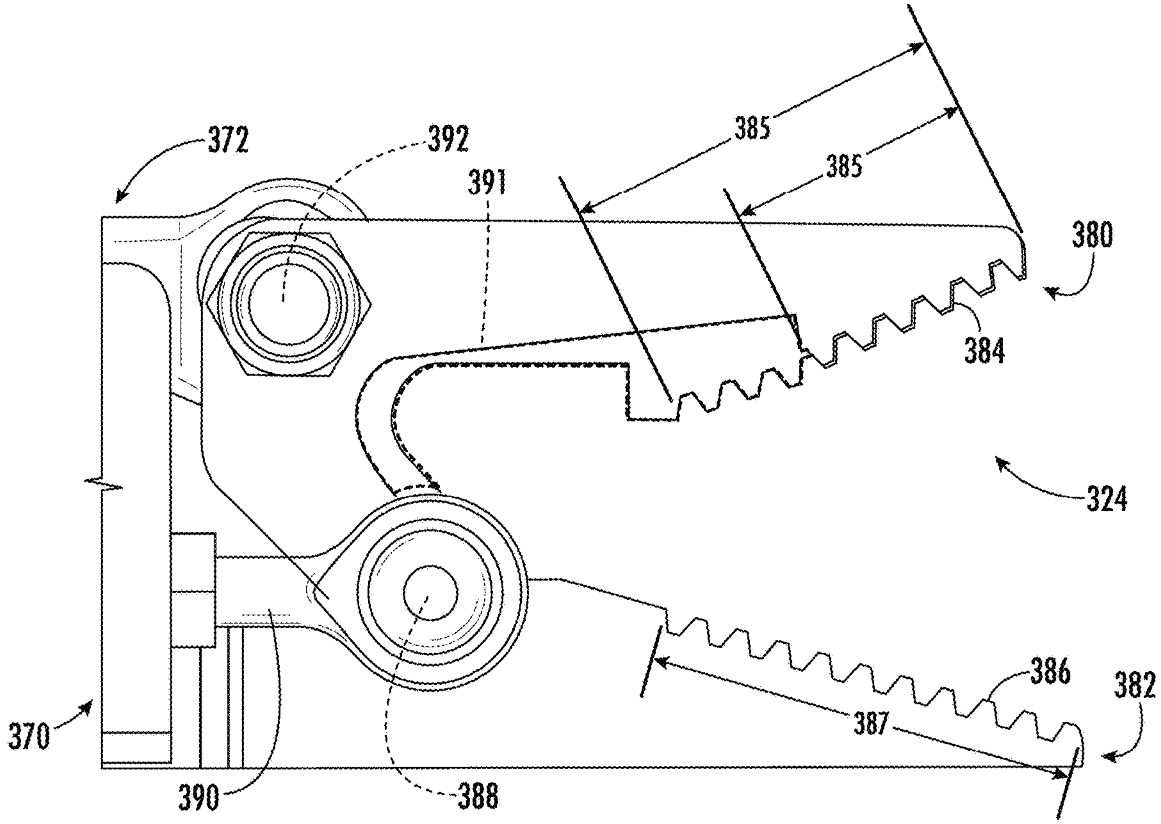
FIG. 9 is a side view of a first clamp of the first clamping assembly of FIG. 7 in a relaxed position, according to an example embodiment.

Referring now to FIG. 9, a side view of the first clamp 324 is shown in the relaxed position. The first engagement surface 384 defines a first engagement length 385 and the second engagement surface 386 defines a second engagement length 387. In some embodiments, the first engagement length 385 and the second engagement length 387 are approximately equal (FIGS. 6 and 7). In some embodiments, the first engagement length 385 is less than the second engagement length 387. In some embodiments, the first engagement length 385 is approximately one-half of the length of the second engagement length 387. For example, a portion of the upper jaw 380, shown as a jaw portion 391, may be removed from the upper jaw 380 such that the first clamp 324 is configured to receive thicker materials (e.g., thicker tread) than the first clamp 324 without the jaw portion 391 removed. In some embodiments, the first clamp 324 is customizable in that the upper jaw 380 may be removed and replaced with a different upper jaw. For example, the upper jaw 380 having the jaw portion 391 may be removed and replaced with an upper jaw not having the jaw portion 391.

When the first clamp 324 is in the engaged position (FIG. 10), the upper jaw 380 not having the jaw portion 391 may define a greater cavity 393 between the upper jaw 380 and the lower jaw 382 than the upper jaw 380 having the jaw portion 391. For example, when extracting treads having thicker lugs 230, a portion of the lugs 230 may be received within the cavity 393 in a position that would otherwise be occupied by the jaw portion 391 of the upper jaw 380. In some embodiments, such as to save on costs, the upper jaw 380 may be similar to the upper jaw 406. Likewise, the upper jaw 380 having the jaw portion 391 may replace the upper jaw 406 in operations where a greater engagement surface length (e.g., first engagement length 385) is desirable.

Figure 11:
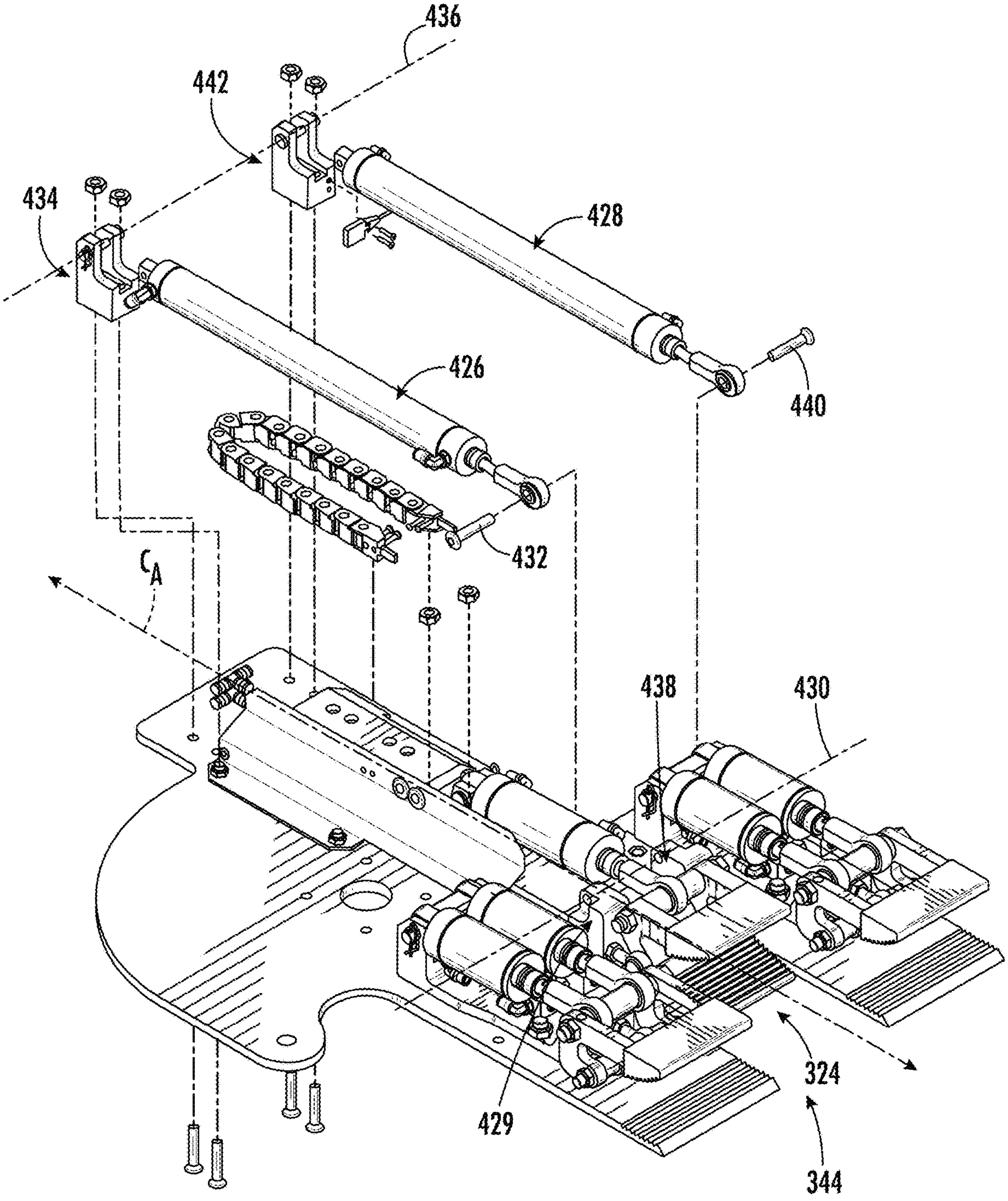
FIG. 11 is a partially exploded view of the tread extractor assembly of FIG. 4, partially assembled.

Referring now to FIG. 11, a partially exploded view of the tread extractor assembly 300 is shown partially assembled. The tread extractor assembly 300 further includes a third actuator 426 and a fourth actuator 428 operatively coupled to the first platform 370 and configured to facilitate movement of the first platform 370, and thus the linear bearing 322, along the linear rail 320 in a direction parallel (e.g., substantially parallel) to the central axis $C_A$.

The first platform 370 further includes a boss flange 429 that defines a fourth pivot axis 430 extending substantially perpendicular to the linear rail 320. The third actuator 426 is pivotally coupled to the first platform 370 about the fourth pivot axis 430. In some embodiments, a rod 432, bolt, bushing, axel, or similar body extends along the fourth pivot axis 430 and is coupled to both the first platform 370 and the third actuator 426. In some embodiments, the rod 432 is pivotally or rotatably coupled to at least one of or both of the first platform 370 and the third actuator 426. The third actuator 426 is pivotally coupled to both the first platform 370 and the base frame 302. In some embodiments, a first fixture boss 434 is coupled to the base frame 302 proximate to the second end 318 and provides a fifth pivot axis 436 about which the third actuator 426 rotates relative to the base frame 302. The third actuator 426 may be pivotally coupled to the first fixture boss 434 by a pin, bushing, or similar member configured to facilitate rotation. The boss flange 429 and the first fixture boss 434 are positioned such that the third actuator 426 extends substantially parallel to the central axis $C_A$ between the fourth pivot axis 430 and the fifth pivot axis 436. In some embodiments, the third actuator 426 includes a swivel joint on one or both ends such that the third actuator 426 may be positioned oblique to the central axis $C_A$ without damaging the third actuator 426, the boss flange 429, and the first fixture boss 434.

The first platform 370 further includes a second boss flange 438 that defines a bore having a central axis positioned along the fourth pivot axis 430. The fourth actuator 428 is pivotally coupled to the second boss flange 438 about the fourth pivot axis 430. In some embodiments, a rod 440, bolt, bushing, axel, or similar body extends along the fourth pivot axis 430 and is coupled to both the first platform 370 and the fourth actuator 428. In some embodiments, the rod 440 is pivotally or rotatably coupled to at least one of or both of the second boss flange 438 and the fourth actuator 428. The fourth actuator 428 is pivotally coupled to both the first platform 370 and the base frame 302. In some embodiments, a second fixture boss 442 is coupled to the base frame 302 proximate to the second end 318 and provides a bore having a central axis that extends along the fifth pivot axis 436 about which the fourth actuator 428 rotates relative to the base frame 302. The fourth actuator 428 may be pivotally coupled to the second fixture boss 442 by a pin, bushing, or similar member configured to facilitate rotation. The second boss flange 438 and the second fixture boss 442 are positioned such that the fourth actuator 428 extends substantially parallel to the central axis $C_A$ between the fourth pivot axis 430 and the fifth pivot axis 436. In some embodiments, the fourth actuator 428 includes a swivel joint on one or both ends such that the fourth actuator 428 may be positioned oblique to the central axis $C_A$ without damaging the fourth actuator 428, the second boss flange 438, and the second fixture boss 442.

The third actuator 426 and the fourth actuator 428 provide a linear force between the first platform 370 and the base frame 302 that causes the first platform 370 to traverse along the linear rail 320. The third actuator 426 and the fourth actuator 428 are operable between a first position and a second position. As shown in FIG. 11, the third actuator 426 and the fourth actuator 428 are in a first position as evident by the first clamping assembly 304 being in a retracted position. In the first position, the third actuator 426 and the fourth actuator 428 define a minimum distance between the fourth pivot axis 430 and the fifth pivot axis 436. In the first position, the first clamp 324 may be positioned between the first end 316 and the second end 318 (e.g., within the base cut-out 344). In the second position, the third actuator 426 and the fourth actuator 428 expand such that a distance between the fourth pivot axis 430 and the fifth pivot axis 436 in the second position is greater than a distance between the fourth pivot axis 430 and the fifth pivot axis 436 in the first position. For example, in the second position, a portion of the tire tread may be clamped within the first clamp 324. After the portion of the tire tread is clamped within the first clamp 324, the third actuator 426 and the fourth actuator 428 may transition from the second position to the first position.

Both the third actuator 426 and the fourth actuator 428 are linear actuators, configured to expand and contract (e.g., elongate and shorten) based on a signal received from a controller. For example, the third actuator 426 may be a fluid power actuator, such as a pneumatic cylinder or hydraulic cylinder. In some embodiments, the third actuator 426 is an electronic ball screw linear actuator. The fourth actuator 428 is substantially similar to the third actuator 426. When the third actuator 426 and the fourth actuator 428 transition between the first position and the second position (e.g., from the second position to the first position), the third actuator 426 and the fourth actuator 428 may push or pull with a combined force of between 150-200 psi. In some embodiments, the third actuator 426 and the fourth actuator 428 may push or pull with a combined force of between 160-180 when transitioning between the first position and the second position.

Figure 12:
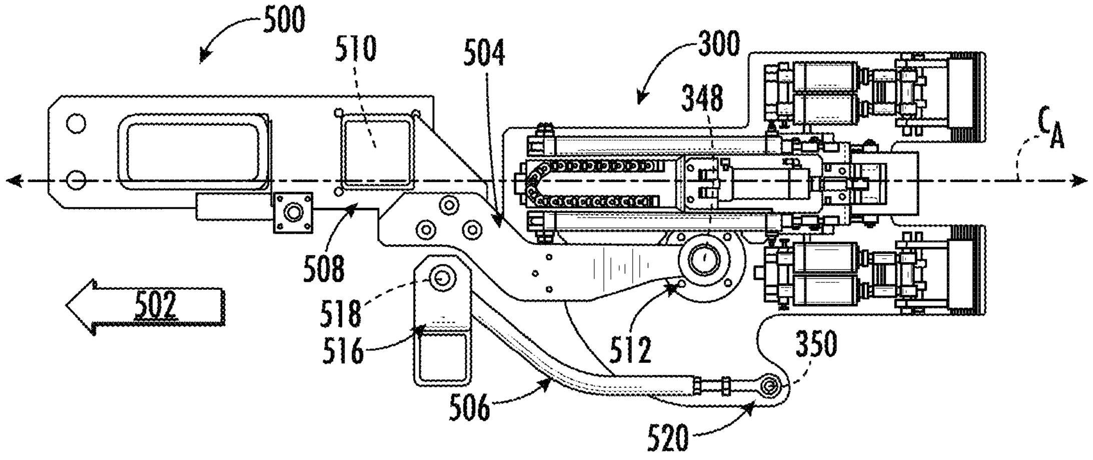
FIG. 12 is a top view of the tread extractor assembly of FIG. 4 operatively coupled to a rail assembly, according to an example embodiment.
Figure 13:
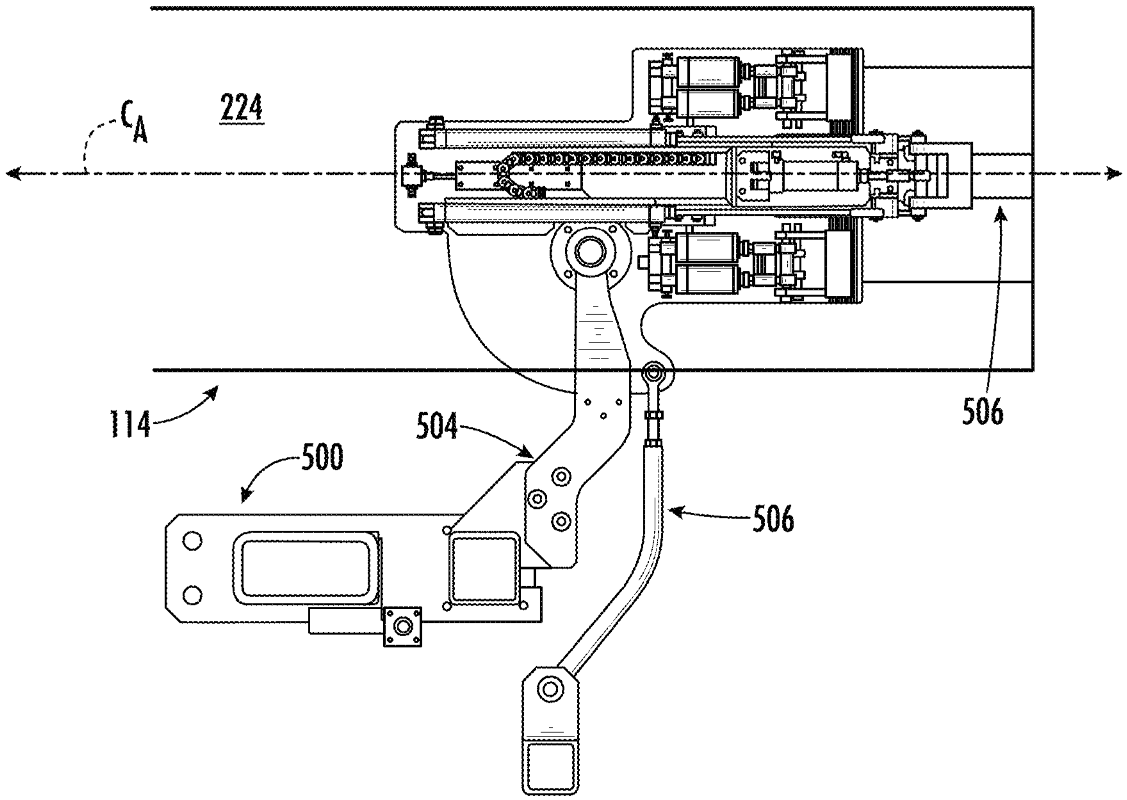
FIG. 13 is a top view of the tread extractor assembly of FIG. 4 pivoted into the curing press of FIG. 1, according to an example embodiment.

Referring generally to FIGS. 12-17, a method of using the tread extractor assembly 300 is disclosed. Referring specifically to FIG. 12, the tread extractor assembly 300 is shown operatively coupled to a rail assembly 500. The rail assembly 500 is configured to swing (e.g., pivot, rotate, turn, etc.) the tread extractor assembly 300 into the curing press 100 and traverse the rail 121 in the extraction direction 502 (e.g., left relative to the page) while the tread extractor assembly 300 is coupled to a tire tread positioned within the curing press 100. The rail assembly 500 includes a first linkage arm 504 and a second linkage arm 506, both the first linkage arm 504 and the second linkage arm 506 operatively coupled between the tread extractor assembly 300 and the rail assembly 500. The rail assembly 500, the first linkage arm 504, the second linkage arm 506, and the base frame 302 cooperate to define a four-bar linkage operable between a first position and a second position. In the first position, the tread extractor assembly 300 is positioned such that the central axis $C_A$ intersects the first linkage arm 504. In some embodiments, the central axis $C_A$ is substantially parallel to the rail 121 in the first position.

The first linkage arm 504 defines a first end 508 pivotally coupled to the rail assembly 500 about a first rail axis 510. The first linkage arm 504 also defines a second end 512 pivotally coupled to the base frame 302, and specifically to the first pivot aperture 348 of the wing 346. In some embodiments, the first linkage arm 504 includes a guide flange 514 (FIG. 15) that extends away from the first linkage arm 504 and abuts the second frame surface 312 of the base frame proximate to the radius 354. The guide flange 514 may facilitate rotation of the base frame 302 relative to the first linkage arm 504. For example, as the tread extractor assembly 300 transitions from the first position to the second position, the guide flange 514 may hug the radius 354 and guide the rotation of the base frame 302 relative to the first linkage arm 504.

The second linkage arm 506 defines a first end 516 coupled to the rail assembly 500 about a second rail axis 518 and a second end 520 pivotally coupled to the base frame 302, and specifically the second pivot aperture 350 of the wing 346. In some embodiments, a distance between the first rail axis 510 and the second rail axis 518 is equal to the pivot distance 352. In some embodiments, a distance between the first rail axis 510 and the first pivot aperture 348 is equal to a distance between the second rail axis 518 and the second pivot aperture 350.

Figure 15:
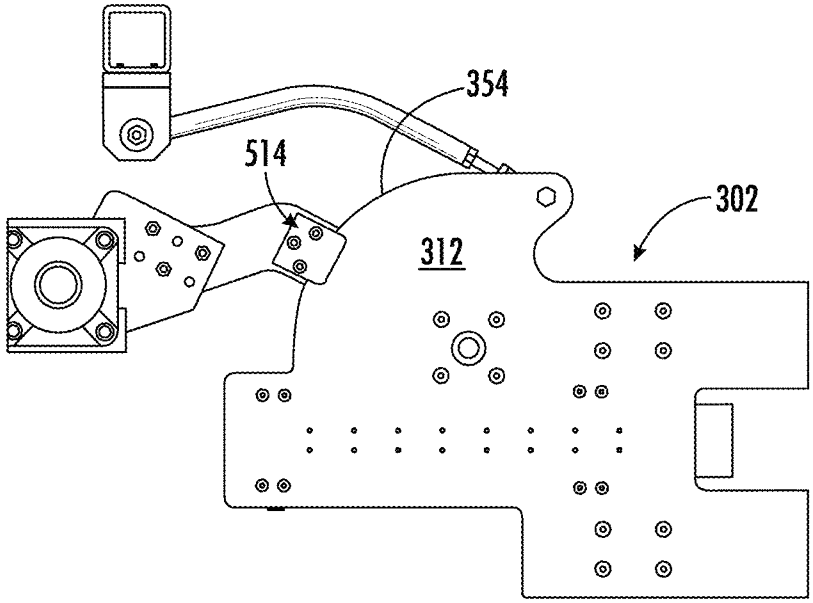
FIG. 15 is a bottom view of the tread extractor assembly of FIG. 4.

Referring now to FIG. 15, a bottom view of the tread extractor assembly 300 is shown. The guide flange 514 is shown coupled to the first linkage arm 504 and abutting the second frame surface 312 of the base frame 302.

Figure 16:
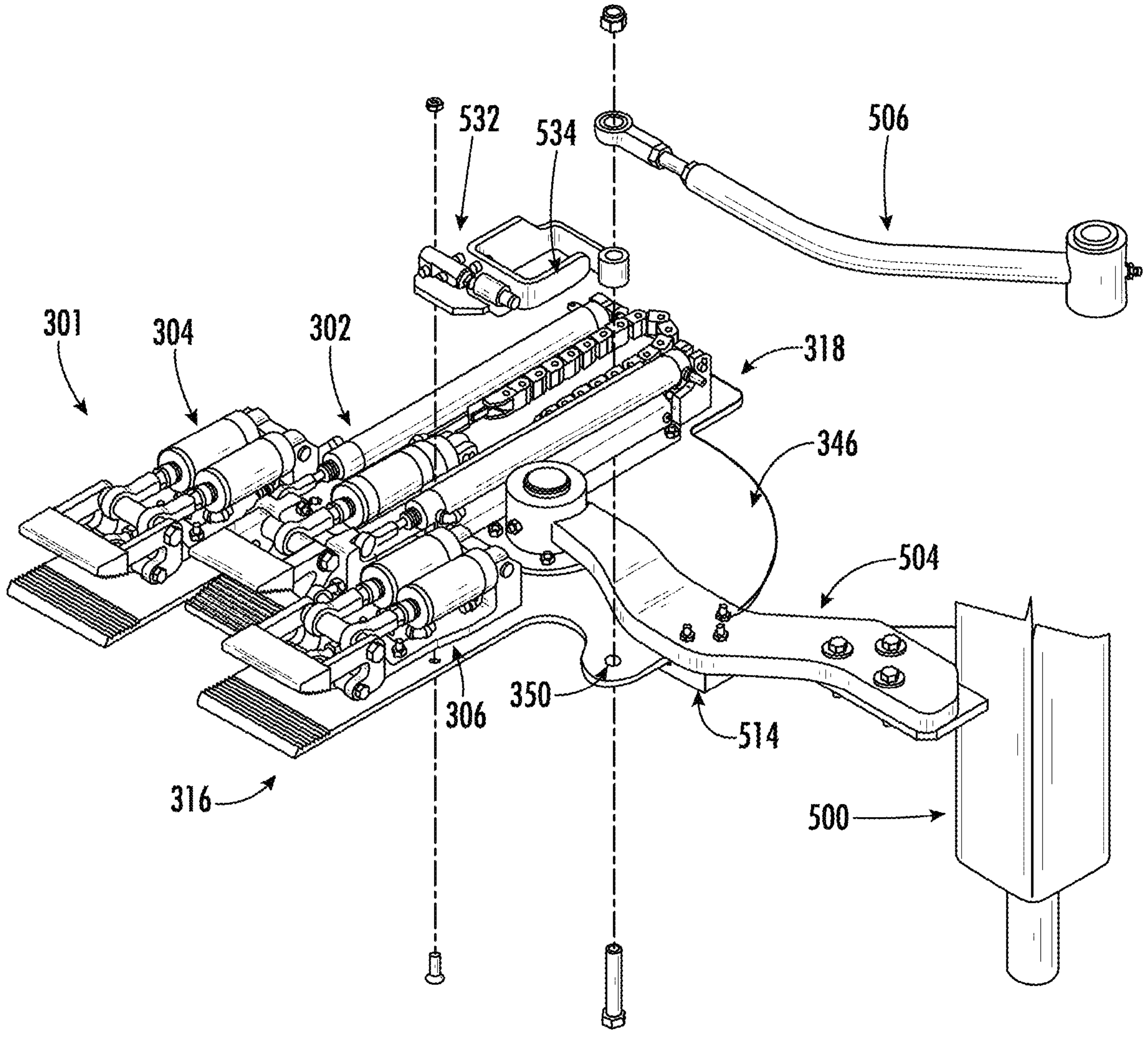
FIG. 16 is a perspective view of a tread extractor assembly coupled to a rail assembly.
Figure 17:
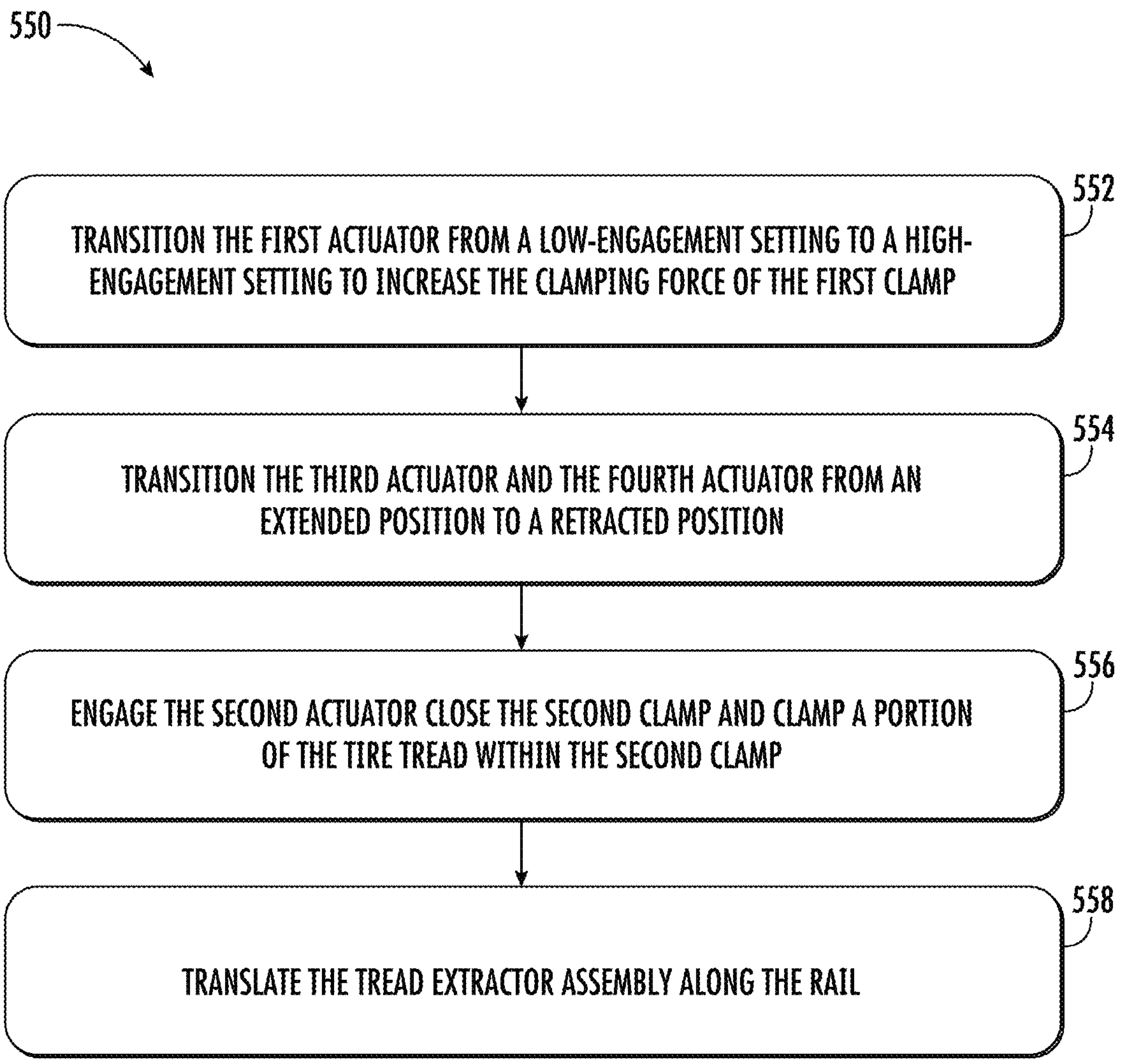
FIG. 17 is a flow chart of a tread extraction process, according to an example embodiment.

Referring to FIG. 16, a tread extractor assembly 301 is shown, according to an exemplary embodiment. The tread extractor assembly 301 is similar to the tread extractor assembly 300. A difference between the tread extractor assembly 301 and the tread extractor assembly 301 is that the ambidextrous wing 346 is positioned on the opposite lateral side such that the tread extractor assembly 301 may pivot in the clockwise direction relative to the rail assembly 500. In some embodiments, a wing 346 extends from both sides of the base frame 302. Coupled to the base frame 302, and shown in an exploded view, is the control switch 532. The control switch 532 includes a handle 534 and is coupled to the base frame 302 such that an operator may engage the control switch 532 to open the first clamp 324 when the first actuator 372 is in the low-engagement setting. Both the tread extractor assembly 300 and the tread extractor assembly 301 may include the control switch 532 and the handle 534.

Referring back to FIG. 13, the tread extractor assembly 300 and the rail assembly 500 are shown transitioning away from the first position and toward the second position. The first linkage arm 504 and the second linkage arm 506 rotate counterclockwise relative to the rail assembly 500 such that the tread extractor assembly 300 pivots counterclockwise relative to the rail assembly 500 and into the curing press 100. The first rail axis 510 and the second rail axis 518 do not move as the tread extractor assembly 300 transitions from the first position to the second position. In some embodiments, the central axis $C_A$ of the tread extractor assembly 300 in the first position is parallel to the central axis $C_A$ of the tread extractor assembly 300 when the tread extractor assembly 300 is between the first position and the second position.

The tread extractor assembly 300 is positioned above the tire tread positioned within the mold 108. Once the tread extractor assembly 300 is positioned above the tire tread, the first platform 370 is extended beyond the first edge 342 at the first end 316. In other words, the third actuator 426 and the fourth actuator 428 are transitioned from the retracted position to the extended position. As the third actuator 426 and the fourth actuator 428 extend from the retracted position to the extended position, the linear bearing 322 translates along the linear rail 320 substantially parallel to the central axis $C_A$. After the first platform 370 is in an extended position such that the first clamp 324 extends beyond the first edge 342, a tab 530 of the tire tread 114 is clamped in the first clamp 324 between the upper jaw 380 and the lower jaw 382. The tab 530 may be molded with the tire tread 114 such that tab 530 and the tire tread 114 are vulcanized at the same time during the tread forming process. In some embodiments, the tab 530 is the flash 227. The tab 530 is structured to be clamped within the first clamp 324 without removing any of the lugs 230 from the mold 108. In some embodiments, the tab 530 is coupled to the tread 114 after the tread forming process. While the tab 530 is shown as having a width approximately equal to a width of the first clamp 324, in some embodiments, the tab 530 extends across the width of the tread 114.

When the first clamp 324, and thus the first platform 370, are extended to the extended position (e.g., first position), the first clamp 324 may be in a closed position as a result of the double-acting first actuator 372. In some embodiments, an operator opens the first clamp 324 by hand by lifting the upper jaw 380 and then inserts the tab 530 into the first clamp 324. In some embodiments, a control switch 532 is provided that is configured to open the first clamp 324 when the first actuator 372 is in the low-engagement setting. The operator may engage the control switch 532 to open the first clamp 324, insert the tab 530 into the first clamp 324, and release the control switch 532 to close the first clamp 324. In some embodiments, the spring mechanism that closes the first clamp 324 when the first actuator 372 is in the low-engagement setting is configured to clamp at a low force such that injury is prevented if an operator accidently releases the control switch 532 and closes the first clamp 324 on their hand or fingers.

After the tab 530 is clamped in the first clamp 324, a tread extraction process 550 begins. The tread extraction process 550 (FIG. 17) includes actuating the first actuator 372, the second actuator 404, the third actuator 426, and the fourth actuator 428 at different times to extract the tread 114 from the mold 108.

An operator may start the tread extraction process 550 by using a controller operatively coupled to the rail assembly 500, operatively coupled to the tread extractor assembly 300, or operatively remote from the rail assembly 500 and the tread extractor assembly 300.

At 552, the first actuator 372 transitions from the low-engagement setting to the high-engagement setting, applying a clamping force to the tab 530.

At 554, the third actuator 426 and the fourth actuator 428 transition from the extended position to the retracted position, pulling the first platform 370, and thus the tab 530, at a pulling force as outlined above. In some embodiments, the tread 114 may begin to be extracted from the mold 108 at 554. The third actuator 426 and the fourth actuator 428 may retract the first clamp 324 to the fully retracted position such that the first clamp 324 is positioned between the first end 316 and the second end 318. In some embodiments, the first clamp 324 is retracted such that the upper jaw 380 and the lower jaw 382 are positioned at the first end 316 and in line with the first edge 342.

Figure 14:
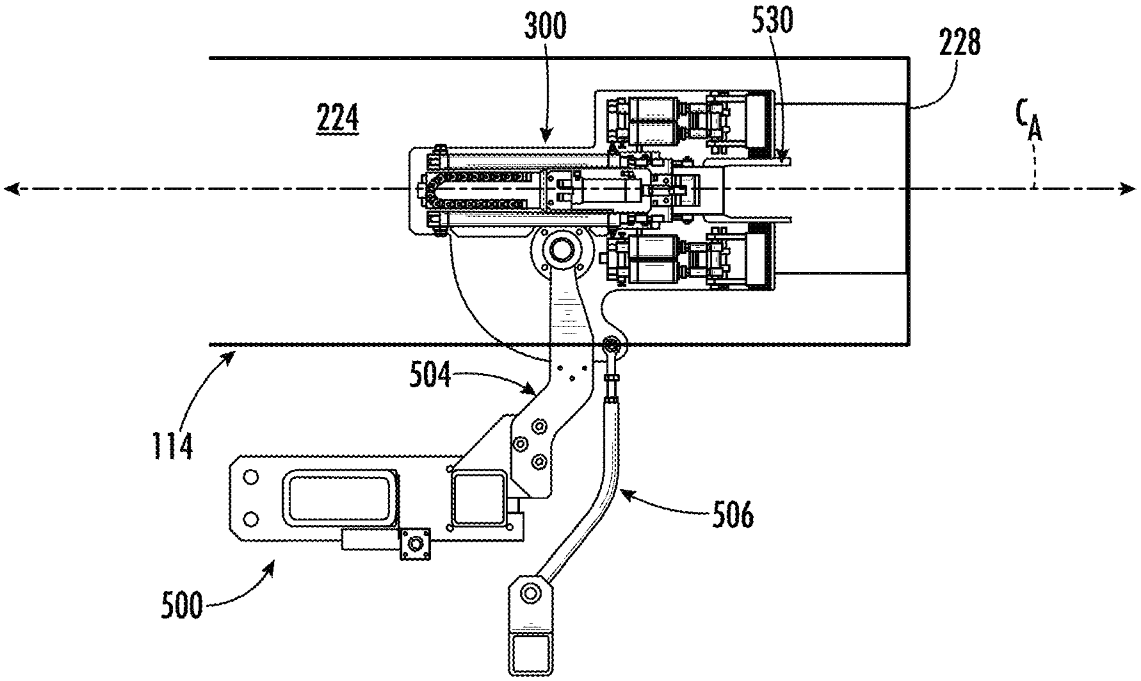
FIG. 14 is a top view of the tread extractor assembly of FIG. 4 pivoted into the curing press of FIG. 1 during a tread extraction process.

At 556, the second clamping assembly 306 and the third clamping assembly 308 clamp down on the tread 114 (FIG. 14). In some embodiments, such as when the first clamp 324 is retracted to the fully retracted position, the second clamping assembly 306 and the third clamping assembly 308 engage with the lugs 230 of the tire tread 114. In some embodiments, such as when the lower jaw 382 is aligned with the first edge 342, the second clamping assembly 306 and the third clamping assembly 308 clamp down on the tab 530. The second actuator 404 clamps the tread 114 with a clamping force as outlined above. The third clamping assembly 308 is substantially similar to second clamping assembly 306 and clamps the tread 114 with a similar amount of force.

At 558, the rail assembly 500 is translated along the rail 121 in the extraction direction 502. As the rail assembly 500 translates in the extraction direction 502, the tread 114 is flipped over such that the flat side is facing in the direction of the mold 108.

In some embodiments, the above steps are placed in a different order. For example, 558 may occur before 552 such that the rail assembly 500 begins to move in the extraction direction 502 along the rail 121 before the first actuator 372 transitions to the high-engagement setting. In some embodiments, step 558 may occur before 554 such that the rail assembly begins to move in the extraction direction 502 before the third actuator 426 and the fourth actuator 428 retract the first clamp 324.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A system comprising:

a rail assembly;

a tread mold comprising a mold cavity having a length and a width smaller than the length;

a rail positioned adjacent the tread mold, the rail assembly configured to translate along the rail; and a tread extraction assembly coupled to the rail assembly, the tread extraction assembly comprising:

a base frame;

a first clamping assembly having a first clamp movable relative to the base frame, the first clamp configured to clamp a portion of a tire tread lying in the tread mold; and a translation actuator configured to extend the first clamping assembly to a position in which the first clamp extends beyond an edge of the base frame and to retract the first clamping assembly to a position in which the first clamp does not extend beyond the edge of the base frame, wherein the rail assembly is configured to traverse the length of the tread mold along the rail while the portion of the tire tread is clamped by the first clamping assembly to extract the tire tread from the tread mold.

2. The system of claim 1, wherein:

the base frame is pivotally coupled to the rail assembly via a first linkage arm and a second linkage arm, and the base frame is operable between a first frame position and a second frame position, where the base frame is positioned over the tread mold when the base frame is in the second frame position.

3. The system of claim 2, wherein the rail assembly, the first linkage arm, the second linkage arm, and the base frame cooperate to define a parallel linkage assembly.

4. The system of claim 1, wherein a clamping actuator of the first clamping assembly is operable between a low-engagement setting and a high-engagement setting, and wherein the first clamp is configured to be in a closed position when the clamping actuator is in the low-engagement setting and when the clamping actuator is in the high-engagement setting.

5. The system of claim 4, wherein, in the low-engagement setting, a spring mechanism biases the first clamp toward the closed position with a first amount of force, and wherein, in the high-engagement setting, the clamping actuator biases the first clamp toward the closed position with a second amount of force that is higher than the first amount of force.

6. The system of claim 5, wherein the first amount of force causes the first clamp to apply a pressure between about 5 psi and about 15 psi.

7. The system of claim 1, further comprising a second clamping assembly comprising a second clamp coupled to the base frame, wherein the first clamping assembly is configured to retract to pull a first end of the tire tread into the second clamp, and the second clamp is configured to clamp the first end of the tire tread.

8. The system of claim 7, wherein the portion of the tire tread that the first clamp is configured to clamp is a tab extending from the first end of the tire tread.

9. The system of claim 7, further comprising a second clamping actuator configured to bias a jaw of the second clamp toward the base frame to clamp the first end of the tire tread between the jaw and the base frame.

10. The system of claim 1, wherein the system is configured to invert the tire tread from a pattern-side downward orientation to a pattern-side upward orientation as the rail assembly traverses the length of the tread mold with the portion of the tire tread clamped by the first clamping assembly.

11. A system for removing a tire tread from a tread mold, the system comprising:

a tread extraction assembly comprising:

a base frame; and a first clamping assembly having a first clamp movable relative to the base frame, the first clamp configured to clamp a portion of the tire tread lying in the tread mold; and a rail assembly configured to translate along a rail positioned adjacent the tread mold, the rail assembly pivotably coupled to the base frame by a first linkage arm and a second linkage arm and configured to pivot the tread extraction assembly from a position adjacent the tread mold to a position over the tread mold, wherein the base frame includes a first edge in the shape of a circular arc, wherein the first linkage arm includes a guide flange configured to hug the first edge of the base frame to guide the rotation of the base frame as the tread extraction assembly pivots.

12. The system of claim 11, wherein the rail assembly, the base frame, the first linkage arm, and the second linkage arm form a four-bar linkage.

13. The system of claim 11, wherein the rail assembly is configured to translate the tread extraction assembly in a direction that flips the tire tread from a pattern side down orientation to a pattern side up orientation.

14. A system for removing a tire tread from a tread mold, the system comprising:

a tread extraction assembly comprising:

a base frame; and a first clamping assembly having a first clamp movable relative to the base frame, the first clamp configured to clamp a portion of the tire tread lying in the tread mold; and a rail assembly configured to translate along a rail positioned adjacent the tread mold, the rail assembly pivotably coupled to the base frame by a first linkage arm and a second linkage arm and configured to pivot the tread extraction assembly from a position adjacent the tread mold to a position over the tread mold, wherein the base frame comprises a removable ambidextrous wing positionable on opposite sides of the base frame and including pivot apertures configured to couple to the first linkage arm and the second linkage arm.

15. A system comprising:

a rail assembly;

a tread mold comprising a mold cavity having a length and a width smaller than the length;

a rail positioned adjacent the tread mold, the rail assembly configured to translate along the rail; and a tread extraction assembly coupled to the rail assembly, the tread extraction assembly comprising:

a base frame; and a first clamping assembly having a first clamp movable relative to the base frame, the first clamp configured to clamp a portion of a tire tread lying in the tread mold, wherein:

the rail assembly is configured to traverse the length of the tread mold along the rail while the portion of the tire tread is clamped by the first clamping assembly to extract the tire tread from the tread mold, the base frame is pivotally coupled to the rail assembly via a first linkage arm and a second linkage arm, and the base frame is operable between a first frame position and a second frame position, where the base frame is positioned over the tread mold when the base frame is in the second frame position.

* * * * *